(12) United States Patent
Zhu et al.

(10) Patent No.: US 11,681,564 B2
(45) Date of Patent: Jun. 20, 2023

(54) HETEROGENEOUS COMPUTING-BASED TASK PROCESSING METHOD AND SOFTWARE AND HARDWARE FRAMEWORK SYSTEM

(71) Applicant: ZTE CORPORATION, Guangdong (CN)

(72) Inventors: Fang Zhu, Guangdong (CN); Xiu Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 115 days.

(21) Appl. No.: 17/298,546

(22) PCT Filed: Nov. 13, 2019

(86) PCT No.: PCT/CN2019/117941
§ 371 (c)(1),
(2) Date: May 29, 2021

(87) PCT Pub. No.: WO2020/108303
PCT Pub. Date: Jun. 4, 2020

(65) Prior Publication Data
US 2022/0350669 A1    Nov. 3, 2022

(30) Foreign Application Priority Data
Nov. 30, 2018 (CN) .......................... 201811453751.3

(51) Int. Cl.
*G06F 9/50* (2006.01)
*G06F 9/38* (2018.01)

(52) U.S. Cl.
CPC .......... *G06F 9/5066* (2013.01); *G06F 9/3851* (2013.01); *G06F 9/5055* (2013.01);
(Continued)

(58) Field of Classification Search
None
See application file for complete search history.

(56) References Cited

U.S. PATENT DOCUMENTS 9,875,142 B2    1/2018  Fritz et al.
2008/0313345 A1*  12/2008  Bernardin ............... G06F 9/505
                                            709/235
(Continued)

FOREIGN PATENT DOCUMENTS

CN    102763086 A    10/2012
CN    104794194 A    7/2015
(Continued)

OTHER PUBLICATIONS

European Patent Office, Extended European Search Report dated Jul. 4, 2022, for corresponding EP application No. 19889941.1.
WIPO, International Search Report dated Jan. 20, 2020.

*Primary Examiner* — Abu Zar Ghaffari
(74) *Attorney, Agent, or Firm* — Li & Cai Intellectual Property (USA) Office

(57) ABSTRACT

A heterogeneous computing-based task processing method, includes: breaking down an artificial intelligent analysis task into one stage or multiple stages of sub-tasks, and completing, by one or more analysis function unit services corresponding to the one stage or multiple stages of sub-tasks, the artificial intelligent analysis task by means of a hierarchical data flow, wherein different stages of sub-tasks have different types, one type of sub-tasks corresponds to one analysis function unit service, and each analysis function unit service uniformly schedules a plurality of heterogeneous units to execute a corresponding sub-task. The disclosure also provides a heterogeneous computing-based software and hardware framework system and a heterogeneous computing-based task processing device.

22 Claims, 12 Drawing Sheets

(52) U.S. Cl.
    CPC .......... *G06F 2209/5017* (2013.01); *G06T 2207/20084* (2013.01)

(56) References Cited

U.S. PATENT DOCUMENTS

| | | | |
|---|---|---|---|
| 2010/0251257 A1* | 9/2010 | Kim | G06F 9/5066 718/105 |
| 2014/0289733 A1* | 9/2014 | Fritz | G06F 9/5066 718/104 |
| 2015/0100964 A1 | 4/2015 | Na et al. | |
| 2017/0017521 A1* | 1/2017 | Gupta | G06F 9/5016 |
| 2017/0255496 A1 | 9/2017 | Deng et al. | |
| 2017/0277654 A1* | 9/2017 | Wang | G06F 9/5083 |
| 2020/0174840 A1* | 6/2020 | Zhao | G06F 9/5011 |

FOREIGN PATENT DOCUMENTS

| | | |
|---|---|---|
| CN | 107291538 A | 10/2017 |
| CN | 105900064 B | 5/2019 |

* cited by examiner

HETEROGENEOUS COMPUTING-BASED TASK PROCESSING METHOD AND SOFTWARE AND HARDWARE FRAMEWORK SYSTEM

TECHNICAL FIELD

Embodiments of the disclosure relate to, but are not limited to, the technical field of artificial intelligent data processing, and in particular, to a heterogeneous computing-based task processing method and software and hardware framework system.

BACKGROUND

With the wide application of face recognition, the artificial intelligent visual technology has gained great attention and practice in the fields of security, commerce, finance and education. Since the implementation of current algorithms of the deep learning technology needs to be supported by a great deal of computing power, implementing the corresponding algorithm by running it only on a Central Processing Unit (CPU) cannot satisfy the user requirements any more, especially for artificial intelligent applications on the edge side. A large number of manufacturers begin to build a high-density processing all-in-one machine by adopting a heterogeneous hybrid acceleration module mode, and establish a cluster to provide unified service capability for end users. Graphics Processing Units (GPUs), Field-Programmable Gate arrays (FPGAs), and even Application Specific Integrated Circuits (ASICs) have become increasingly popular as acceleration modules.

SUMMARY

Embodiments of the disclosure provide a heterogeneous computing-based task processing method and software and hardware framework system that can provide high-performance service capability.

In one aspect, an embodiment of the present disclosure provides a heterogeneous computing-based task processing method, applied to a work node including a plurality of heterogeneous units, which includes: breaking down an artificial intelligent analysis task into one stage or multiple stages of sub-tasks; completing, by one or more analysis function unit services corresponding to the one stage or multiple stages of sub-tasks, the artificial intelligent analysis task by means of a hierarchical data flow; wherein different stages of sub-tasks have different types, one type of sub-tasks corresponds to one analysis function unit service, and each analysis function unit service uniformly schedules a plurality of heterogeneous units to execute a corresponding sub-task.

In another aspect, an embodiment of the present disclosure provides a heterogeneous computing-based software and hardware framework system, including: at least one work node, any of which includes a plurality of heterogeneous units; the work node is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a hierarchical data flow; wherein different stages of sub-tasks have different types, one type of sub-tasks corresponds to one analysis function unit service, and each analysis function unit service uniformly schedules the plurality of heterogeneous units in the work node to execute a corresponding sub-task.

In another aspect, an embodiment of the present disclosure provides a heterogeneous computing-based task processing device, including: a heterogeneous computation management module, and a plurality of heterogeneous units; the heterogeneous computation management module is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a hierarchical data flow; wherein different stages of sub-tasks have different types, one type of sub-tasks corresponds to one analysis function unit service, and each analysis function unit service uniformly schedules a plurality of heterogeneous units to execute a corresponding sub-task. In another aspect, an embodiment of the present disclosure provides a computer-readable medium storing a heterogeneous computing-based task processing program, wherein the task processing program, when executed, implements the steps of the heterogeneous computing-based task processing method as described above.

In an embodiment of the present disclosure, the artificial intelligent analysis task can be performed by the analysis function unit services that manage the heterogeneous units uniformly by means of a hierarchical data flow. The embodiment can realize model sharing, service isolation and service flow integration of the loaded multiple heterogeneous units based on the analysis function unit services, thereby reducing the loading time of the same model, improving the task execution efficiency and improving the overall running stability of the flow processing.

Other features and advantages of the disclosure will be set forth in the description which follows, and will become apparent from the description at least partially, or be understood by implementing the disclosure. Objects and other advantages of the disclosure can be realized and obtained by means of the structures particularly pointed out in the description, appended claims and drawings.

BRIEF DESCRIPTION OF THE DRAWINGS

Accompanying drawings are provided for further understanding of the technical solution of the disclosure and constitute a part of the specification. Hereinafter, these drawings are intended to explain the technical solution of the disclosure together with the following embodiments, but should not be considered as a limitation to the technical solution of the disclosure.

DETAILED DESCRIPTION

Embodiments of the present disclosure will be described in detail below with reference to the accompanying drawings. It should be noted that the embodiments of the disclosure and features herein can be combined with each other in any manner as long as they are not contradictory.

The steps illustrated in the flowchart of the drawings can be executed in a computer system such as a set of computer-executable instructions. Also, although a logical order is shown in the flowchart, in some cases, the steps shown or described can be performed in a different order than illustrated herein.

Figure 1:
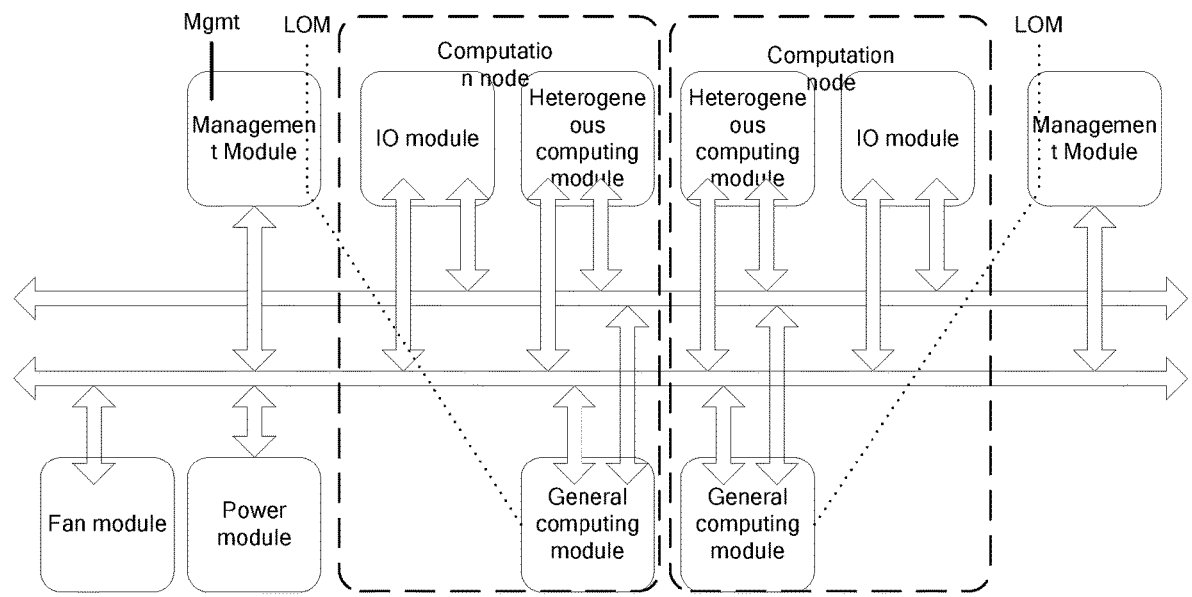
FIG. 1 is a schematic structural diagram of internal logic of an artificial intelligent heterogeneous all-in-one machine.
Figure 2:
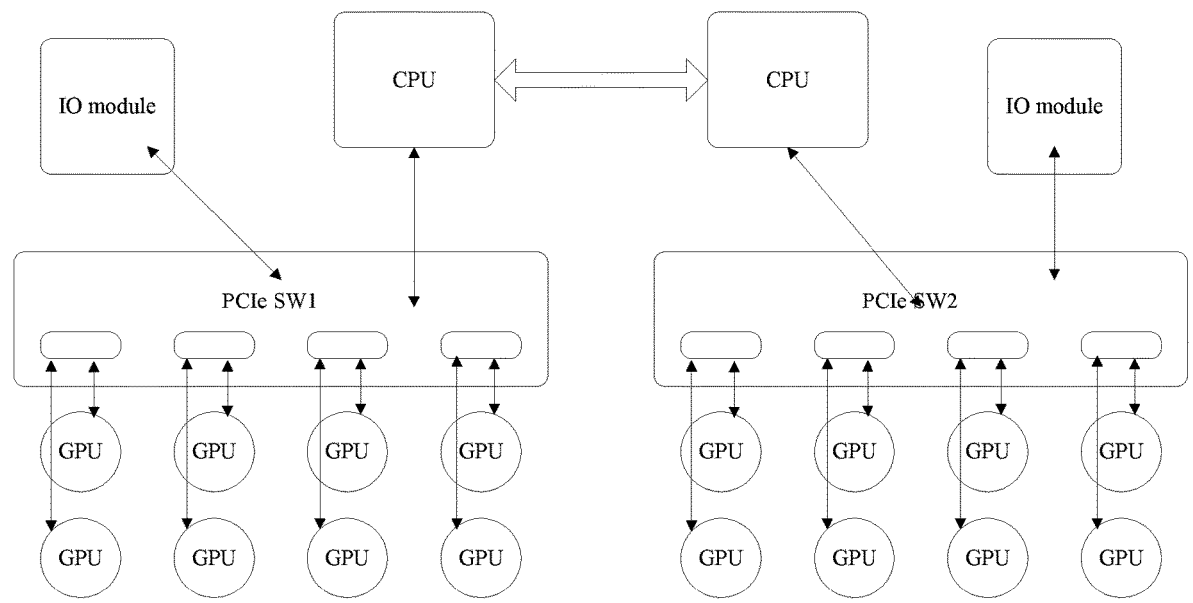
FIG. 2 is a schematic diagram showing components of the general computing module and the heterogeneous computing module shown in FIG. 1.

FIG. 1 is a schematic structural diagram of internal logic of an artificial intelligent heterogeneous all-in-one machine. FIG. 2 is a schematic diagram showing components of the general computing module and the heterogeneous computing module shown in FIG. 1.

The artificial intelligent heterogeneous all-in-one machine shown in FIG. 1 can include: a fan module, a power module, two management modules, two Input/Output (IO) modules (such as network cards), two heterogeneous computing modules, and two general computing modules. In an exemplary embodiment, the management module has a network management port (Mgmt); and the general computing module can support LAN on Motherboard (LOM). The artificial intelligent heterogeneous all-in-one machine shown in FIG. 1 includes two compute nodes. In an exemplary embodiment, each compute node can include an IO module, a heterogeneous computing module, and a general computing module. However, the present disclosure is not limited thereto. In other implementations, a compute node can include only a heterogeneous computing module or a general computing module; or a compute node can include two or more heterogeneous computing modules.

As shown in FIG. 2, the general computing module can include a CPU, and the heterogeneous computing module can include a plurality of heterogeneous units, such as GPUs. In FIG. 2, the number ratio of CPUs to GPUs is 1:8. In an exemplary embodiment, the general computing module and the heterogeneous computing module can be connected via a peripheral component interconnect express (PCI-Express, PCIe) bus.

In order to satisfy demands of users and provide sufficient computing power, multiple heterogeneous units (such as GPUs) need to be unified into a single heterogeneous all-in-one machine, and coordination of multiple heterogeneous all-in-one machines needs to be completed. Among others, what should be considered includes how to complete local data storage and transportation among heterogeneous units and between a heterogeneous unit and a heterogeneous all-in-one machine, as well as how to arrange artificial intelligent analysis tasks of multiple users to realize high-performance overall service capability. Especially for edge-side enabled intelligent service providers in various industries, the overall service capability of the above resources and task organizations is of great importance. Furthermore, a relatively simple and standard interface is desired for application logic programming.

Embodiments of the present disclosure provide a heterogeneous computing-based task processing method and software and hardware framework system. According to the embodiments of the disclosure, the artificial intelligent analysis task is completed jointly by the analysis function unit services in a hierarchical data flow mode, thereby improving the task execution efficiency and the running stability; unified service of data storage and transportation is achieved through a Hardware Abstraction Layer (HAL); and by establishing a distributed heterogeneous all-in-one machine cluster with resource-oriented characteristics and integrating support to heterogeneous units, coordination of multiple heterogeneous all-in-one machines can be achieved.

Figure 3:
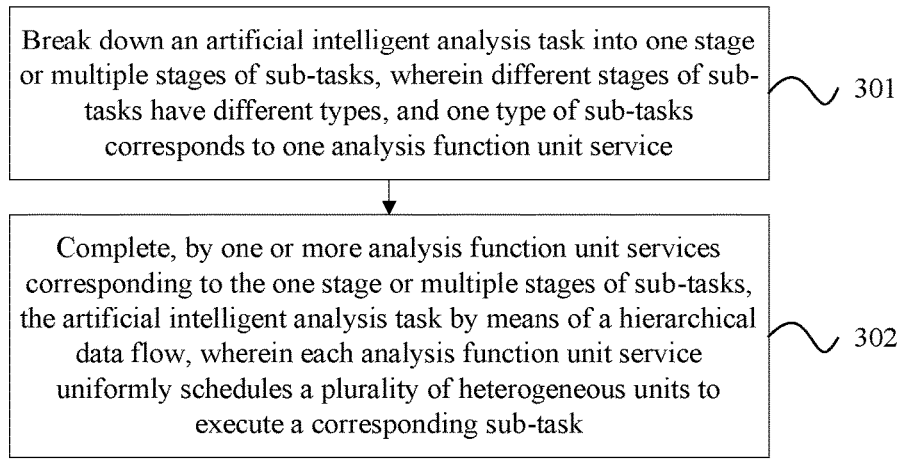
FIG. 3 is a flowchart of a heterogeneous computing-based task processing method according to an embodiment of the present disclosure.

FIG. 3 is a flowchart of a heterogeneous computing-based task processing method according to an embodiment of the present disclosure. The task processing method according to this embodiment can be applied to a work node (e.g., a heterogeneous all-in-one machine) including a plurality of heterogeneous units.

In an exemplary embodiment, the heterogeneous unit can include one or more of: a CPU, a GPU, an FPGA and an ASIC. For example, the work node can include a plurality of GPUs, or can include a GPU and an FPGA, or can include a GPU, an FPGA, and an ASIC.

In an exemplary embodiment, the work node can implement the following standard characteristics through a standard Software Shell and a standard Hardware Shell: unified memory of a single work node; concurrent support to a multitask progress of a single heterogeneous unit; Remote Direct Memory Access (RDMA) between heterogeneous units; and concurrent computation and transmission of heterogeneous units.

A single work node can implement the HAL unified service of data storage and transportation based on a master CPU. Based on RDMA between heterogeneous units, data copy tasks from one heterogeneous unit directly to another can be implemented. Based on concurrent computation and transmission of heterogeneous units, mixed tasks of data copy and computation can be completed. For example, after data is put into a First in First out (FIFO) queue through an asynchronous transfer command, a next compute command can be executed directly, which depends on the data already prepared in the FIFO queue without having to wait for the completion of the previous transfer command. Thus, two tasks are mixed and completed at the same time.

In an exemplary embodiment, the work node can be provided with a heterogeneous computation management framework configured to support heterogeneous units based on a heterogeneous daemon. The heterogeneous computation management framework can include at least: a heterogeneous daemon client and a heterogeneous daemon server; the heterogeneous daemon client can be configured to maintain and manage an accelerated computation task queue of an artificial intelligent analysis task, manage a client side task context, and provide a standard read/write interface for input data and output data of the artificial intelligent analysis task at the client side; the heterogeneous daemon server can include an application layer task management module and a kernel layer acceleration module block type driving management module. The application layer task management module is configured to provide a client service interface, maintain and manage an accelerated computation task queue of the artificial intelligent analysis task at the server side, and manage a server side task context; and the kernel layer acceleration module block type driving management module is configured to provide a read/write interface for block driving data, and manage and schedule channels and queues of the acceleration module. The acceleration module can be a heterogeneous unit that performs accelerated computation tasks.

As shown in FIG. 3, the heterogeneous computing-based task processing method provided in this embodiment includes the following steps 301 to 302.

At step 301, breaking down an artificial intelligent analysis task into one stage or multiple stages of sub-tasks, wherein different stages of sub-tasks have different types, and one type of sub-tasks corresponds to one analysis function unit service.

At step 302, completing, by one or more analysis function unit services corresponding to the one stage or multiple stages of sub-tasks, the artificial intelligent analysis task by means of a hierarchical data flow, wherein each analysis function unit service uniformly schedules a plurality of heterogeneous units to execute a corresponding sub-task.

Herein, the analysis function unit service can refer to a service set demonstrated after breaking down an artificial intelligent analysis task into a function primitive based on the professional semantics of the computer vision algorithm.

In an exemplary embodiment, the artificial intelligent analysis task can include a visual artificial intelligent reasoning task; and analysis function unit service corresponding to the visual artificial intelligent reasoning task can include: a video image format decoding service, an image target detection service, an image target tracking and optimal selection service and a target feature value extraction service. However, the present disclosure is not limited thereto.

In this exemplary embodiment, a visual artificial intelligent reasoning task can be broken down into the following four stages of sub-tasks: a video image format decoding task, an image target detection task, an image target tracking and optimal selection task and a target feature value extraction task; and each stage of sub-tasks corresponds to one analysis function unit service. The whole visual artificial intelligent reasoning task can be completed jointly by the four analysis function unit services in a hierarchical data flow mode. The four analysis function unit services can schedule the heterogeneous units, respectively, to execute corresponding sub-tasks (for example, the video image format decoding service can schedule a heterogeneous unit to execute the video image format decoding task), and the heterogeneous units respectively scheduled by the four analysis function unit services can perform the corresponding sub-tasks in a streaming manner.

In an exemplary embodiment, the multiple stages of sub-tasks corresponding to the artificial intelligent analysis task can be executed by the same heterogeneous unit in a streaming mode, or be executed by at least two heterogeneous units in a streaming mode. For example, an artificial intelligent analysis task can be broken down into four stages of sub-tasks (corresponding to four analysis function unit services, respectively), and the four analysis function unit services can schedule the same heterogeneous unit to execute the four stages of sub-tasks in a streaming mode; or, two of the analysis function unit services can schedule the same heterogeneous unit to execute the corresponding sub-tasks, while the remaining two analysis function unit services can schedule another heterogeneous unit to execute the corresponding sub-tasks; or, the four analysis function unit services can schedule different heterogeneous units, respectively, to execute corresponding sub-tasks, i.e., each stage of sub-tasks is executed by a different heterogeneous unit. However, the present disclosure is not limited thereto.

In an exemplary embodiment, data flow interaction can be implemented between different analysis function unit services via the RDMA service provided by an HAL. After the work node implements the HAL unified service of data storage and transportation based on the master CPU, a distributed shared memory pipeline can be provided based on the RDMA service provided by a unified data layer HAL to implement data flow interaction among different analysis function unit services. After the heterogeneous unit executes the corresponding sub-task, the analysis function unit service corresponding to that stage of sub-tasks can store the run output data to a designated storage location, so that the analysis function unit service corresponding to the next stage of sub-task can acquire data from the designated storage location via the distributed shared memory pipeline provided by the unified data layer HAL, and use the data as runtime input data of the next stage of sub-task. The runtime output data of a plurality of sub-tasks corresponding to the same analysis function unit service can be placed in the same designated storage location.

In an exemplary embodiment, each analysis function unit service is executed in a loop in the heterogeneous unit with data pending. Having initiated, the analysis function unit service runs continuously, and once no data is to be processed (i.e., no sub-task is to be processed), the analysis function unit service can enter a sleep state; and once there is data pending (i.e., there are pending sub-tasks), it can be resumed to running from the sleep state in time.

In an exemplary embodiment, each analysis function unit service can be a progress corresponding to a runtime context. The runtime context corresponding to the analysis function unit service can include, for example, information as follows: information of the heterogeneous unit that can be scheduled by the analysis function unit service, information of the sub-task that is currently executed and of the heterogeneous unit that executes the sub-task, information of the storage location of the runtime input data of the sub-task corresponding to the analysis function unit service, and information of the storage location of the runtime output data of the sub-task corresponding to the analysis function unit service. However, the present disclosure is not limited thereto.

In this embodiment, the model loaded by the analysis function unit service can be provided to a plurality of heterogeneous units managed by the analysis function unit service, so as to realize model sharing of multiple heterogeneous units, reduce the loading time of the same model, and improve the task execution efficiency. Moreover, when any analysis function unit service has a problem, running of other analysis function unit services will not be influenced, and different analysis function unit services have service isolation characteristics, thereby improving the overall running stability of the flow processing.

In an exemplary embodiment, each analysis function unit service can record a snapshot of a running result of the corresponding sub-task. The recorded time point of the snapshot can be set according to actual needs, which is not limited herein. After the analysis function unit service records the snapshot of the running result, when a heterogeneous unit has a problem in execution of the sub-task, execution of the sub-task can be resumed according to the snapshot of the running result.

In an exemplary embodiment, step 301 can include: determining, according to a type of the artificial intelligent analysis task, information of a registered service set corresponding to the type; and breaking down the artificial intelligent analysis task into one stage or multiple stages of sub-tasks according to the information of the registered service set. The work node can provide an interface to an upper application (or a third party algorithm) so that the upper application performs service registration via the interface. For example, a processing procedure and step (analysis function unit service) related to implementation of a certain algorithm, as well as a type of Process Element (PE), a storage location and a size of the data, and the like suggested by the processing procedure involved in the implementation of the algorithm, can be designated.

In an exemplary embodiment, before step 301, the task processing method of this embodiment can further include: determining that local resources of the work node satisfy execution requirements of the artificial intelligent analysis task. Responsive to determining that the local resources satisfy the execution requirements of the artificial intelligent analysis task (for example, the local computing resources are idle, data required by the artificial intelligent analysis task is locally stored, or the like), the work node processes the artificial intelligent analysis task.

In an exemplary embodiment, a cluster consisting of a plurality of work nodes is deployed with a global scheduling module, and stores global task state information therein. The task processing method of this embodiment can further include: submitting, when the work node determines that the local resources cannot satisfy the execution requirements of the artificial intelligent analysis task, the artificial intelligent analysis task to the global scheduling module of the cluster, where the global scheduling module determines a work node for executing the artificial intelligent analysis task by inquiring the global task state information. In the cluster consisting of work nodes, scheduling of the artificial intelligent analysis task can be implemented based on resource-oriented characteristics.

In an exemplary embodiment, a work node can be a heterogeneous all-in-one machine, and a cluster consisting of work nodes can be a heterogeneous all-in-one machine cluster.

Figure 4:
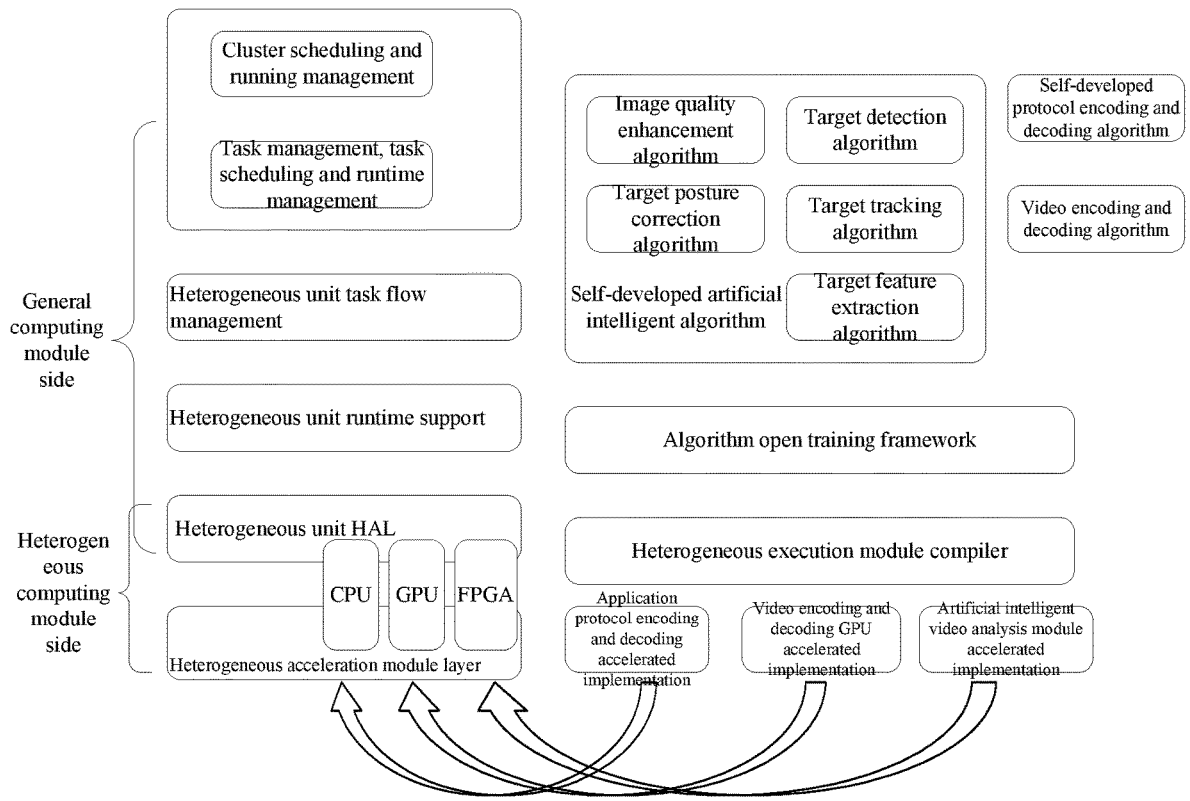
FIG. 4 is a schematic diagram showing a software framework of a heterogeneous all-in-one machine according to an embodiment of the present disclosure.

FIG. 4 is a schematic diagram showing a software framework of a heterogeneous all-in-one machine according to an embodiment of the present disclosure. It should be noted that FIG. 4 illustrates an improved portion of the heterogeneous all-in-one machine involved in the embodiment of the present disclosure (e.g., the heterogeneous all-in-one machine illustrated in FIG. 1).

As shown in FIG. 4, the heterogeneous all-in-one machine includes at least: a general computing module (e.g., a CPU), and a heterogeneous computing module (e.g., including heterogeneous units such as GPUs, FPGAs, etc.). The following functions can be deployed on the general computing module side: cluster scheduling and running management; native task management, task scheduling and runtime management; heterogeneous unit task flow management; heterogeneous unit runtime support; and heterogeneous unit HAL. The heterogeneous computing module side can be deployed with: a heterogeneous unit HAL, a heterogeneous acceleration module layer.

In an exemplary embodiment, based on the cluster scheduling and runtime management function deployed on the general computing module side, a cluster of a heterogeneous all-in-one machine can be established; and based on the heterogeneous unit runtime support function deployed on the general computing module side, running of various types of heterogeneous units under the architecture of the all-in-one machine cluster can be supported. Based on the heterogeneous unit HAL deployed at the general computing module side and the heterogeneous computing module side, the requirements of heterogeneous storage resource virtualization and unified, efficient and standard computing software and hardware can be satisfied. Based on the heterogeneous unit task flow management function deployed on the general computing module side, flow organization and runtime management of the local artificial intelligent analysis tasks in the heterogeneous unit can be realized. In other words, the artificial intelligent analysis task is broken down into one stage or multiple stages of sub-tasks, and corresponding analysis function unit services uniformly schedule a plurality of heterogeneous units to execute a corresponding sub-task and the heterogeneous unit executes the multiple stages of sub-tasks in a streaming manner.

In an exemplary embodiment, as shown in FIG. 4, a self-developed artificial intelligent algorithm (e.g., an image quality enhancement algorithm, a target posture correction algorithm, a target detection algorithm, a target tracking algorithm, and a target feature extraction algorithm); self-developed protocol encoding and decoding algorithm; and a video encoding and decoding algorithm can be registered in the heterogeneous all-in-one machine. In an exemplary embodiment, a CPU of the heterogeneous acceleration module layer can be deployed to execute a self-developed protocol encoding and decoding algorithm to realize accelerated application protocol encoding and decoding; a GPU can be deployed to run a video encoding and decoding algorithm to realize accelerated video encoding and decoding; and a FPGA can be deployed to run a self-developed artificial intelligent algorithm to realize accelerated artificial intelligent video analysis. In an exemplary embodiment, CPU, GPU and FPGA can execute a binary stream compiled by a heterogeneous execution module compiler.

In FIG. 4, the algorithm open training framework can include: Convolutional framework for Fast Feature Embedding (Caffe) and TensorFlow. However, the present disclosure is not limited thereto.

In an exemplary embodiment, by integrating heterogeneous unit runtime support based on a heterogeneous daemon into a distributed artificial intelligent computing cluster runtime management framework (Ray: 2017 Berkeley), a resource-oriented distributed heterogeneous all-in-one machine cluster and a heterogeneous resource organizational framework (i.e., the heterogeneous computation management framework) can be realized. Compared with an artificial intelligent big data platform based on Spark+Caffe, the organizational framework provided by the embodiment is more suitable for edge artificial intelligent application on multitasking and scheduling, has better performance, and organically integrates support to the heterogeneous units.

Figure 5:
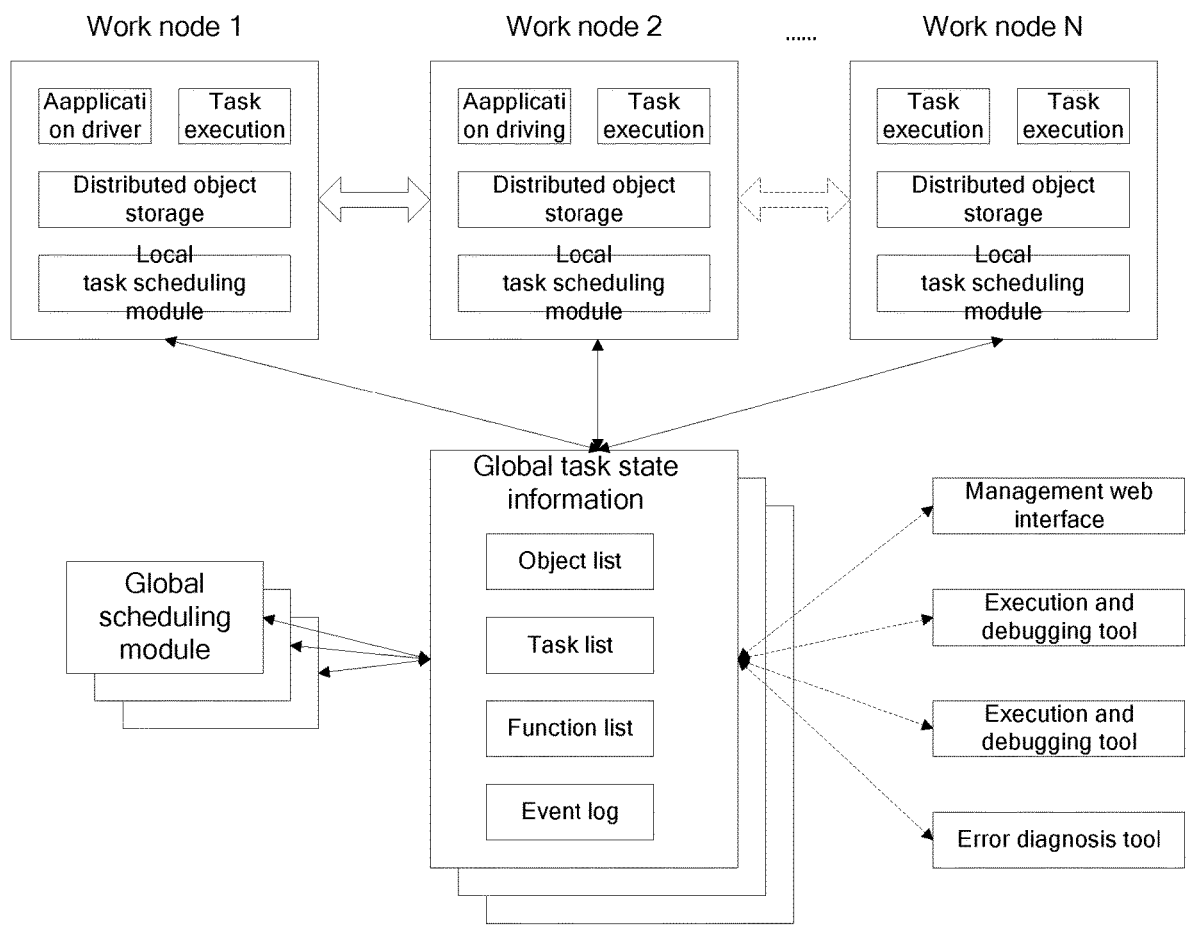
FIG. 5 is a schematic diagram showing an organizational framework of a heterogeneous all-in-one machine cluster according to an embodiment of the present disclosure.

FIG. 5 is a schematic diagram showing an organizational framework of a heterogeneous all-in-one machine cluster according to an embodiment of the present disclosure. The heterogeneous all-in-one machine (for example, an artificial intelligent reasoning all-in-one machine) on the edge side has a multi-task request, and the work nodes physically deploy dispersed service requirements. Current big data cluster organizational frameworks, such as Spark, which is centrally scheduled, has the defects that the communication cost of a corresponding required model is not negligible and the scheduling cost is high. The organizational framework shown in FIG. 5 is established with reference to the distributed artificial intelligent computing cluster runtime management framework Ray. However, the present disclosure is not limited thereto. In other implementations, the organizational framework described above can be developed independently.

The heterogeneous all-in-one machine cluster of the present exemplary embodiment has distributed resource-oriented features. As shown in FIG. 5, there can be N work nodes, where N can be a positive integer greater than 1.

The organizational framework shown in FIG. 5 has the following features: the work node is provided with a local task scheduling module, via which tasks can be scheduled first in the neighborhood; and is provided with a distributed global scheduling module and stores global task state information therein so that the work of debugging, operation and maintenance and the like can be conveniently carried out. The distributed memory sharing service can be adopted among the work nodes to complete the transmission of resources (such as a deep learning neural network model, a network weight of a specific task, a classification feature map and the like) required by high-speed computation.

As shown in FIG. 5, the work node can deploy the global task state information required for the global scheduling module through distributed object storage. In an exemplary embodiment, the global task state information can include an object list, a task list, a function list, and an event log. The global scheduling module existing in a multi-machine standby manner is deployed at a specific work node or a single physical machine in a cluster election manner, which is not limited herein.

In an exemplary embodiment, the work node where the global scheduling module is located can implement debugging, operation and maintenance, or other operations of the cluster through a management web interface, an execution and debugging tool, a performance diagnosis tool, and an error diagnosis tool.

Figure 6:
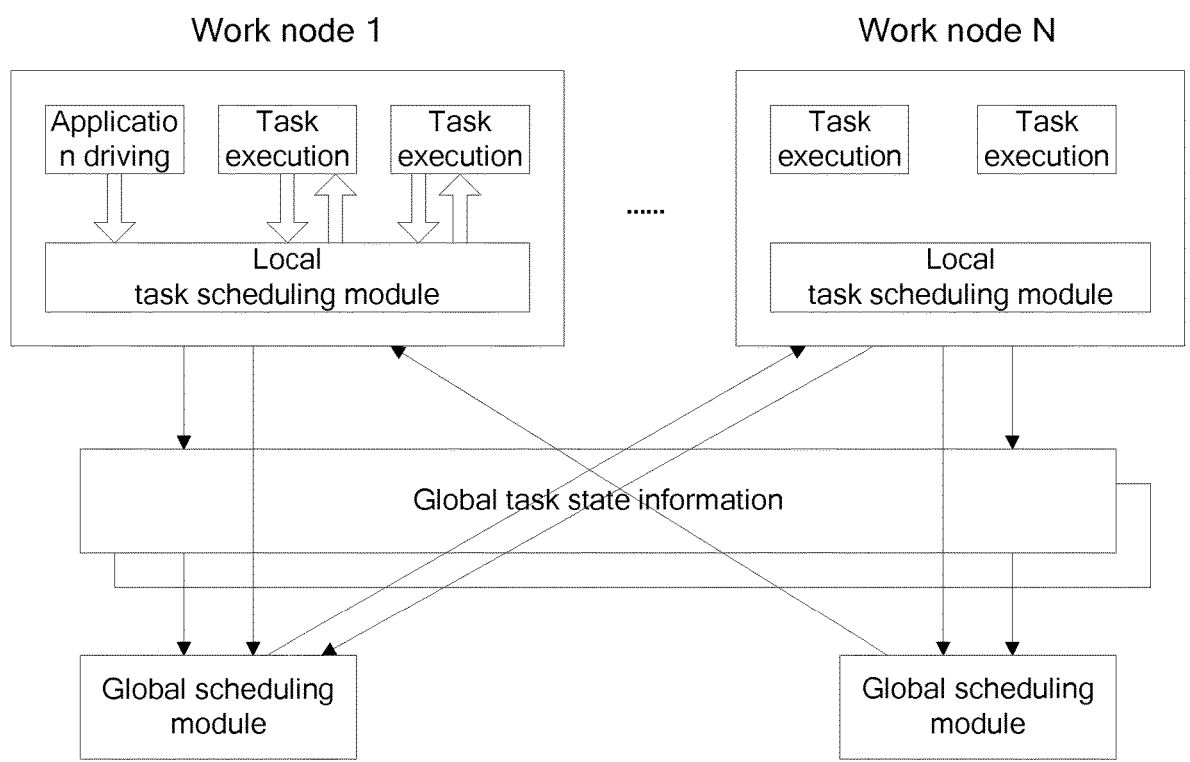
FIG. 6 is a schematic diagram of a runtime scheduling procedure of the heterogeneous all-in-one machine cluster shown in FIG. 5.

FIG. 6 is a schematic diagram of a runtime scheduling procedure of the heterogeneous all-in-one machine cluster shown in FIG. 5. As shown in FIG. 6, the actual scheduling procedure of the distributed resource orientation in this exemplary embodiment is as follows:

Any application completes the submission of an artificial intelligent analysis task (such as a visual artificial intelligent reasoning task) through local (such as work node 1) application driver, and the submitted artificial intelligent analysis task can include an analysis type and data to be analyzed (such as image data to be classified). The local task scheduling module of the work node 1 will perform local task scheduling in conjunction with local resources, such as idleness of computing resources and availability of related data. If the local resources do not satisfy the execution requirements of the artificial intelligent analysis task (for example, a feature map or deep network model (including weights) of the relevant analysis classification is not available, or the local computing resources are fully loaded), the local task scheduling module will submit the artificial intelligent analysis task to the global scheduling module, and simultaneously synchronize the local relevant resource information (such as a task type, data objects carried by the computer and IDs thereof, the required data objects and IDs thereof) to the global task state information deployed in the shared memory. The distributed global scheduling module queries global task state information, completes remote deployment of the artificial intelligent analysis task (for example, schedules the artificial intelligent analysis task to the work node N) with reference to resource information of the dispersed work nodes, while, by means of the distributed memory sharing service, completing the transmission of resources (such as a deep learning neural network model required by the artificial intelligent analysis task, network weights, a classification feature map and the like) required by high-speed computation.

In an exemplary embodiment, the heterogeneous all-in-one machine can include a GPU, an FPGA, and an artificial intelligent reasoning ASIC like Google TPU (Tensor Processing Unit) integrated for efficient implementation of artificial intelligent analysis tasks (e.g., artificial intelligent computation tasks such as video artificial intelligent reasoning tasks). In this exemplary embodiment, the heterogeneous unit based on a heterogeneous daemon can be integrated into the cluster organizational architecture of the heterogeneous all-in-one machine.

Figure 7:
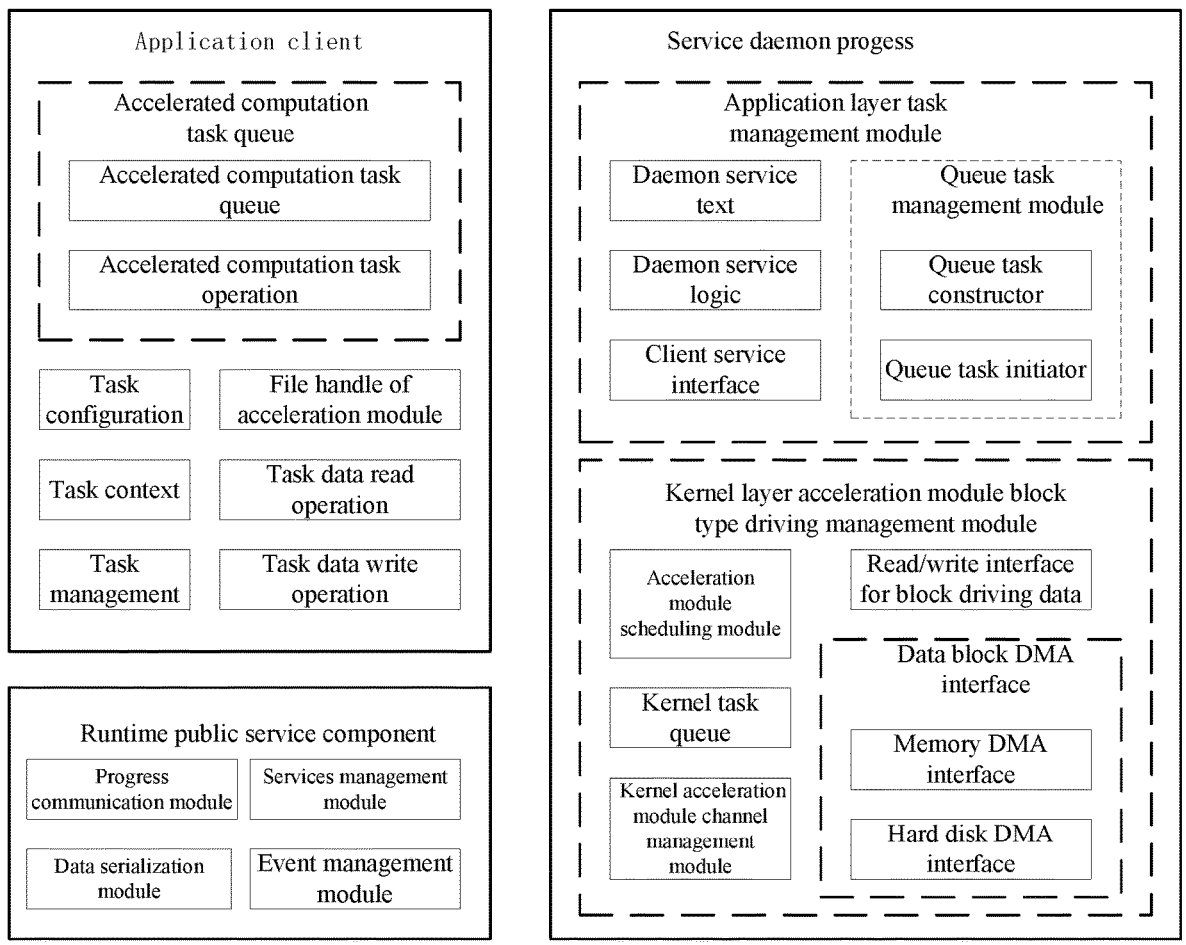
FIG. 7 is a schematic diagram showing component modules of a heterogeneous unit management framework component module based on a heterogeneous daemon according to an embodiment of the disclosure.
Figure 8:
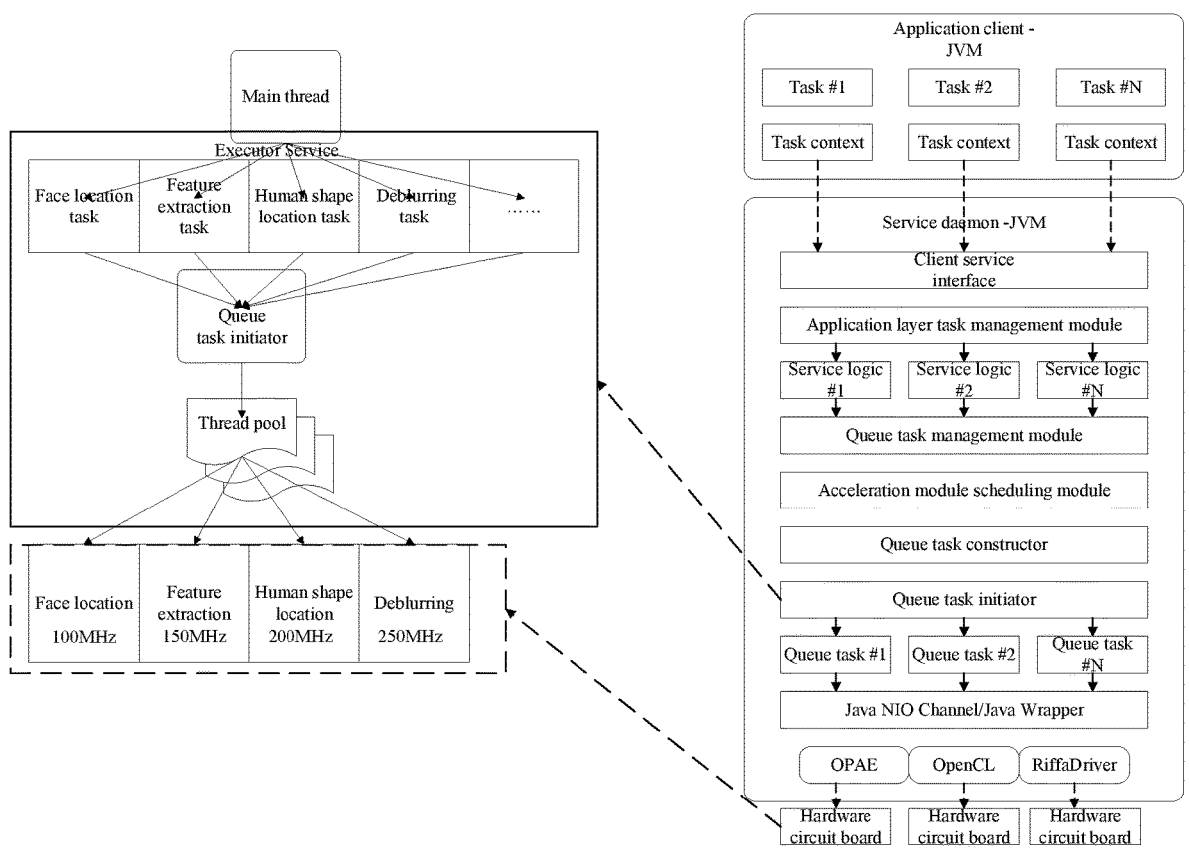
FIG. 8 is a schematic diagram of a running heterogeneous unit management framework based on a heterogeneous daemon according to an embodiment of the present disclosure.

FIG. 7 is a schematic diagram showing component modules of a heterogeneous unit management framework based on a heterogeneous daemon (i.e., the heterogeneous computation management framework as described above) according to an embodiment of the disclosure. FIG. 8 is a schematic diagram of a running heterogeneous unit management framework based on a heterogeneous daemon according to an embodiment of the present disclosure. The heterogeneous unit management framework shown in FIG. 7 can implement a unified organization of computing resources of a heterogeneous all-in-one machine with multiple heterogeneous units. FIG. 8 illustrates deployment locations and interrelation of the corresponding specific runtime environments (including a Java Virtual Machine (JVM)) in running of the heterogeneous computation management framework.

As shown in FIG. 7, the heterogeneous computation management framework deployed on any work node in this embodiment can include: a heterogeneous daemon client (an application client), a heterogeneous daemon server and a runtime public service component.

In an exemplary embodiment, the heterogeneous daemon client can include: an accelerated computation task queue, a task configuration, a task context, task management, file handle of the acceleration module, task data read operation and task data write operation. The heterogeneous daemon client can maintain and manage an accelerated computation task queue of an artificial intelligent analysis task, wherein it can maintain and manage the accelerated computation task data and the accelerated computation task operation; manage a client side task context; and provide a standard read/write interface for input data and output data of the artificial intelligent analysis task at the client side.

In an exemplary embodiment, the heterogeneous daemon server can include a service daemon in which a user state exists; and the service daemon can include: an application layer task management module and a kernel layer acceleration module block type driving management module. The application layer task management module can include: a daemon service context (task context on the server side), a daemon service logic (service logic on the server side), a client service interface and a queue task management module, wherein the queue task management module can include a queue task constructor and a queue task initiator. The application layer task management module can provide a client service interface, manage a server side task context, and maintain and manage an accelerated computation task queue of the artificial intelligent analysis task at the server side.

The kernel layer acceleration module block type driving management module can include: an acceleration module scheduling module, a kernel task queue (for recording a task queue of analysis function unit services to be accelerated and executed), a kernel acceleration module channel management module (for managing channels of the acceleration module), a read/write interface for block driving data, and a data block Direct Memory Access (DMA) interface, wherein the data block DMA interface can include a memory DMA interface and a hard disk DMA interface. The kernel layer acceleration module block type driving management module can provide a read/write interface for block driving data, manage and schedule channels and queues of the acceleration module, and provide DMA interfaces to the shared memory and a hard disk file system. The acceleration module can be a heterogeneous unit that performs accelerated computation tasks.

In an exemplary embodiment, the runtime public service component can include a progress communication module, an event management module, a data serialization module, and a services management module. The runtime public service component is configured to support interaction between the heterogeneous daemon client and the heterogeneous daemon server. The progress communication module can be configured to support communication between the heterogeneous daemon client and the heterogeneous daemon server and between different analysis function unit services. The event management module can be configured to register and cancel events based on event communication, and manage event receivers and initiators. The data serialization module can be configured to serialize and deserialize data objects such as models and feature maps. The service management module can be configured to manage services registered via the application interface.

FIG. 8 is a schematic diagram of a running heterogeneous unit management framework based on a heterogeneous daemon according to an embodiment of the present disclosure. As shown in FIG. 8, the application client running on JVM submits a plurality of artificial intelligent analysis tasks, each of which (for example, tasks 1 to N) contains a specific task context thereof, i.e., a task initiator, a submitter of the task result, task processing steps, sources and addresses of the task data, etc.

The service daemon running on JVM receives each artificial intelligent analysis task through the client service interface by means of the progress communication module, and then delivers the artificial intelligent analysis task to the application layer task management module. The application layer task management module can generate and maintain corresponding service logics aiming at different tasks by combining the service management module with the task type. The service logic corresponds to a processing flowchart taking the analysis function unit services as basic units after each artificial intelligent analysis task is broken down into one stage or multiple stages of sub-tasks (analysis function unit service tasks). Each stage of sub-tasks corresponds to one analysis function unit service. For example, the service logic can match corresponding analysis function unit services for each artificial intelligent analysis task according to information of a registered service set, thereby converting the artificial intelligent analysis task into a combination of analysis function unit service tasks.

Then, the application layer task management module delivers the analysis function unit service task to be accelerated to the queue task management module and the acceleration module scheduling module for processing. The queue task management module can manage the analysis function unit service corresponding to each artificial intelligent analysis task (each analysis function unit service is responsible for the corresponding analysis function unit service task queue). The acceleration module scheduling module can allocate computing resources to the analysis function unit service. For example, for a certain analysis function unit service, an acceleration module having such analysis function unit service tasks and having an execution capability with idle computing resources can be scheduled to the analysis function unit service, so that the analysis function unit service schedules the service tasks in the analysis function unit service task queue to the corresponding acceleration module for execution.

In an exemplary embodiment, the queue task constructor can be configured to construct an analysis function unit service task containing the complete information, which is divided by the queue task initiator divides into queue tasks, and then, the queue tasks are executed by the corresponding hardware circuit board via a Java NIO Channel or Java Wrapper.

In an exemplary embodiment, after determining the acceleration module to execute the analysis function unit service task, the queue task constructor can acquire the registered service information, and check whether the scheduled acceleration module is consistent with the device required for executing the analysis function unit service task according to the registered service information. If yes, the analysis function unit service task including the complete information (e.g., input data storage address information, output data storage address information, etc.) can be constructed. The queue task initiator can complete downloading and initiation of the device parameter configuration and the execution flow that are issued to a corresponding hardware circuit board to execute the analysis function unit service task.

For example, the following four queues of analysis function unit service tasks can be initiated by the queue task initiator: face location, feature extraction, human shape location and deblurring. These four queues of tasks can be executed by different acceleration modules, such as processed by GPU, FEGA, and ASIC, respectively. However, the present disclosure is not limited thereto.

In an exemplary embodiment, through a standard Software Shell and a standard Hardware Shell, a single work node (i.e., a work node with a plurality of heterogeneous units, wherein any heterogeneous unit can be used as an acceleration module) can have the standard characteristics of: unified memory of a single work node; concurrent support to a multitask progress of a single acceleration module; Direct Remote Direct Memory Access (RDMA) between acceleration modules; and concurrent computation and transmission of acceleration modules. Based on the additional software and hardware standard characteristics of the acceleration module and the single work node, the single work node can implement the HAL unified service of data storage and transportation based on a master CPU. That is, the HAL implemented by the Software Shell and the Hardware Shell realizes that, for different heterogeneous units, the master CPU can deliver operation commands of unified standards based on unified memory addressing, complete efficient concurrent computation and transmission, and enable remote and direct data access between the acceleration modules. Meanwhile, for different heterogeneous units, scheduling of the data computation task has a unified multi-task concurrent processing mechanism, thereby achieving consistency of the heterogeneous scheduling.

Figure 9:
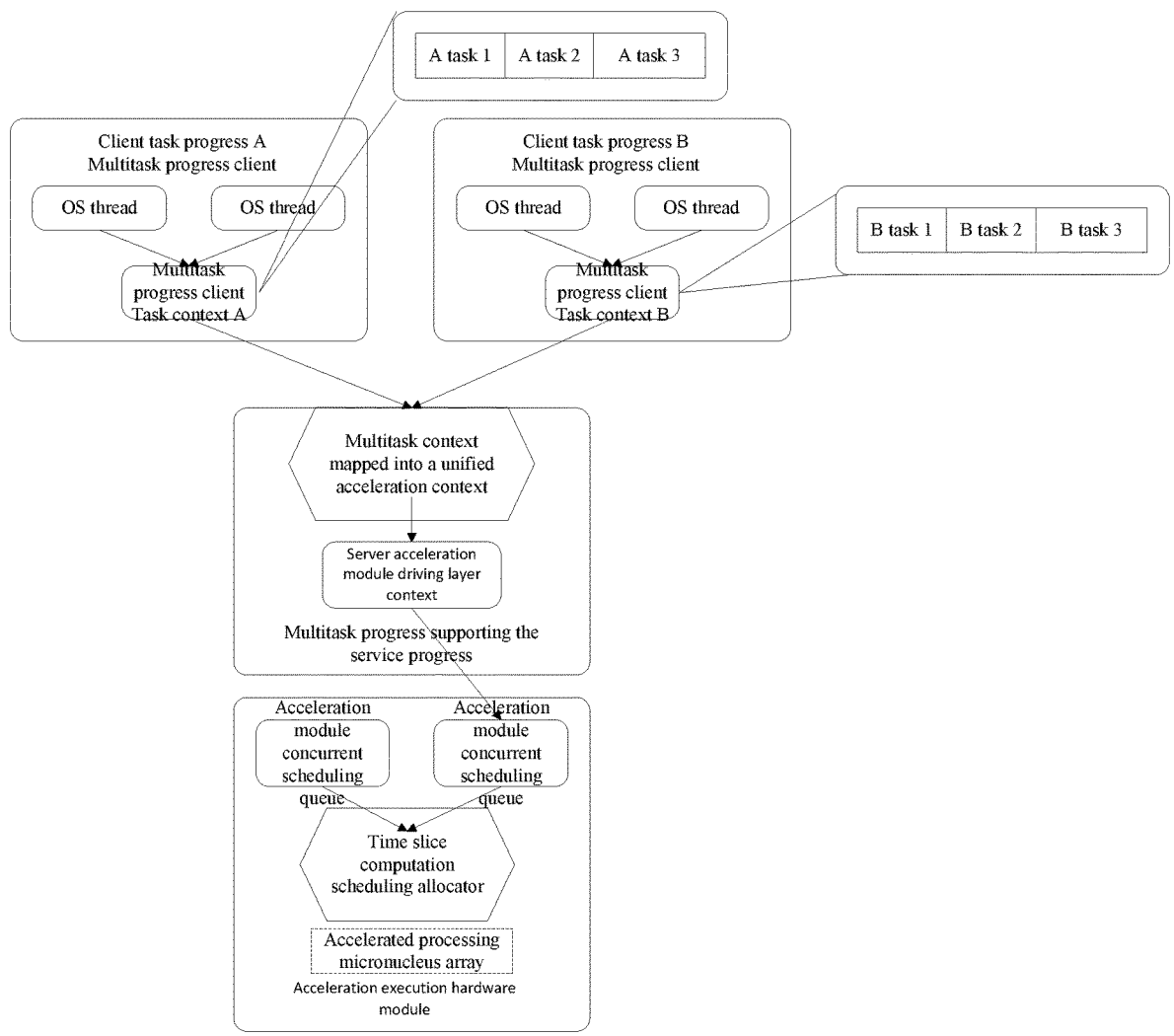
FIG. 9 is a frame diagram showing implementing components of a single acceleration module of the heterogeneous all-in-one machine providing concurrent support to a multitask progress according to an embodiment of the present disclosure.

FIG. 9 is a frame diagram showing implementing components of a single acceleration module of the heterogeneous all-in-one machine providing concurrent support to a multitask progress according to an embodiment of the present disclosure. FIG. 9 shows that in order to make the heterogeneous hardware have a unified multitask concurrent processing mechanism, a multitask progress supporting service progress needs to be constructed in the Software Shell to map a multi-task context into a unified acceleration context, and then the unified acceleration context is issued to a server acceleration module driving layer context. Also, a time slice computation scheduling allocator needs to be constructed in the Hardware Shell. The specific scheduling distribution mechanism is not limited herein.

As shown in FIG. 9, a client task context A and a client task context B are mapped into a unified acceleration context. For example, the memory addresses thereof are subjected to unified virtual address mapping. The server acceleration module driving layer context is configured to deliver a task to an acceleration execution hardware module through driving. The acceleration execution hardware module includes two acceleration module concurrent scheduling queues which respectively correspond to task A and task B; such as allocating to each progress time allowed to perform the task by the time slice computation scheduling allocator.

Figure 10:
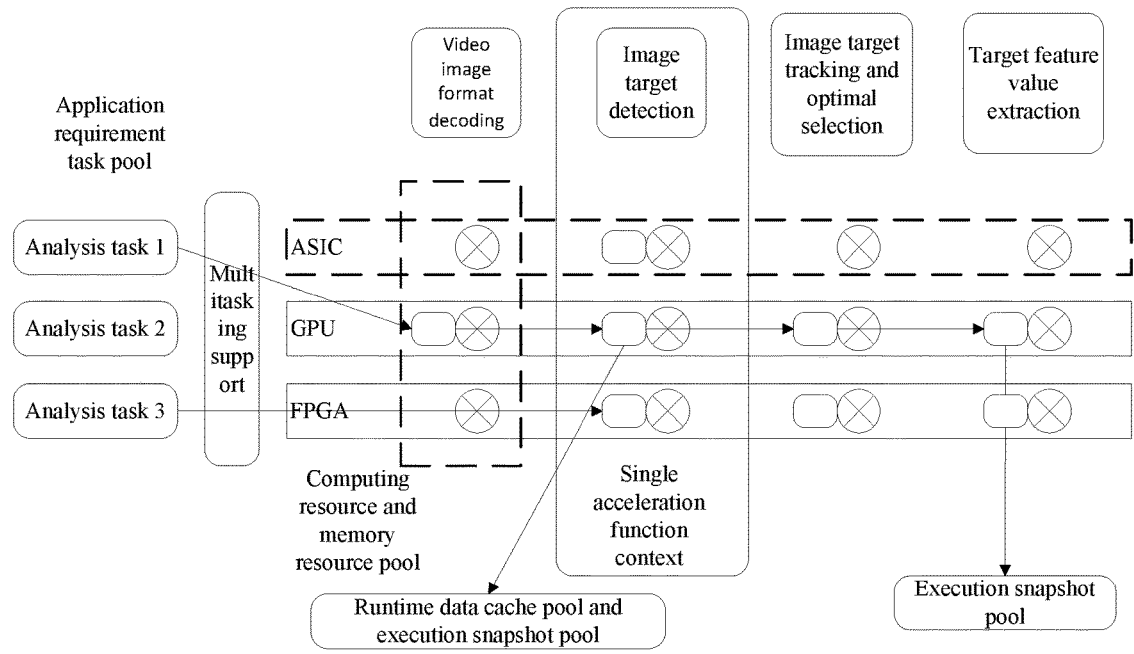
FIG. 10 is a block diagram showing management and execution based on HAL unified services and flow analytics services according to an embodiment of the present disclosure.

FIG. 10 is a block diagram showing management and execution based on HAL unified services and flow analytics services according to an embodiment of the present disclosure. In this exemplary embodiment, a single work node will implement the HAL unified service of data storage and transportation based on a master CPU. Combined with the unified data layer HAL, the whole artificial intelligent analysis task can be completed by a combination of analysis function unit services (such as a face extraction service for face recognition) with unified management of multi-bearing acceleration modules in a hierarchical data flow mode. The analysis function unit service refers to a service set demonstrated after breaking down the whole artificial intelligent analysis procedure into a function primitive based on the professional semantics of the computer vision algorithm.

In an exemplary embodiment, an instance of the analysis function unit service can be a progress. The analysis function unit service forms unified management for a plurality of acceleration modules executing the same type of analysis functions (i.e., the above sub-tasks), one analysis function unit service corresponds to one runtime context, and the analysis function unit services can be executed in the acceleration modules in a loop with data pending.

In an exemplary embodiment, data interconnection among the analysis function unit services is realized via a distributed shared memory pipeline provided by the unified data layer HAL, and recording of the snapshot of the data running result is thus completed. Through the hierarchical-analysis function unit services with independent running contexts and the independent unified data layer HAL, a plurality of artificial intelligent analysis tasks can be converted and combined into a multistage pipelined deployment mode. Since each stage of the pipelined analysis function unit service has independent runtime context, and the runtime input and output data are stored through the independent HAL unified data layer, the method has the characteristics of quick recovery from a running failure and safety isolation of services, and improves the overall running stability of the flow processing. Moreover, a single pipelined analysis function unit service can be shared by models for multiple artificial intelligent analysis tasks, thereby reducing the loading time of the same model.

In an exemplary embodiment, after a single analysis function unit service is initiated, the allocated available computing resources are obtained through the acceleration module scheduling module. After receiving the analysis function unit service task, the analysis function unit service can determine whether spare computing resources are available, according to the runtime context (including a list of acceleration modules which can be run by the registered service, a list of operation file handles, the data flow relations relied on before and after the service and a list of related corresponding bearing acceleration units), by checking the task execution condition on the currently schedulable acceleration module (for example, which acceleration modules are executing which analysis function unit service tasks). If spare computing resources are available, it is determined that the acceleration module with the spare computing resources is used to execute the corresponding analysis function unit service task. Then, the complete analysis function unit service task can be constructed by the queue task constructor, and the constructed analysis function unit service task is delivered to the acceleration module for execution through the queue task initiator. The analysis function unit service can acquire runtime input data of the analysis function unit service from a designated input data storage location, and save runtime output data of the analysis function unit service to a designated output data storage location so that a next stage of analysis function unit service acquires data from the output data storage location.

As shown in FIG. 10, an analysis task 1 can be converted into a deployment mode including four stages of pipelined sub-tasks (corresponding to the analysis function unit services of: a video image format decoding service, an image target detection service, an image target tracking and optimal selection service and a target feature value extraction service). That is, the analysis task 1 is converted into four analysis function unit service tasks (i.e., four stages of sub-tasks): a video image format decoding task, an image target detection task, an image target tracking and optimal selection task and a target feature value extraction task. An analysis task 3 is converted to only an image target detection task. The image target detection service can schedule a GPU node to execute the image target detection task of the analysis task 1, and can schedule an FPGA node to execute the image target detection task corresponding to the analysis task 3. As shown in FIG. 10, the four stages of sub-tasks corresponding to the analysis task 1 can be executed by a GPU node, and the one stage of sub-tasks corresponding to the analysis task 3 can be executed by an FPGA node. However, the present disclosure is not limited thereto.

As shown in FIG. 10, execution of each stage of the streaming analysis function unit service tasks is managed by a corresponding analysis function unit service (i.e., a single progress), and corresponds to a runtime data cache pool and an execution snapshot pool, wherein the runtime data cache pool is configured to store runtime input and output data at specified storage locations, and the execution snapshot pool can record snapshots of running results of the execution data. For example, the image target detection service can uniformly manage image target detection tasks executed on GPU and FPGA, corresponding to one runtime context. In other words, an artificial intelligent analysis task can be completed through a pipelined combination of four progresses.

In an exemplary embodiment, through the heterogeneous computation management framework, the work node can provide the four available interfaces to an upper application (e.g., a third-party algorithm):

(1) LoadProcessingStepsConfig

This interface is configured to designate related processing procedures and steps involved in implementation of the whole algorithm (for example, face recognition relates to the procedures of: face extraction, face quality judgment, face feature extraction and face feature comparison).

The parameters can be configuration files in the eXtensible Markup Language (XML) format or arrays in a defined format, and can include the metadata, the format and the size transferred in the procedure.

(2) SetMemorySectionRegions

This interface is configured to designate the type of Process Element (PE) (acceleration module), and the location and the size of data storage proposed by the processing procedure involved in implementation of the whole algorithm.

The parameters can be configuration files in the XML format or arrays in a defined format, and can include a PE type in the procedure distribution and the storage type and size occupied by the acceleration module.

(3) SetPEBin

This interface is configured to designate the PE (acceleration module) executed binary stream available for the processing procedure involved in implementation of the whole algorithm.

The parameters can be memory or a file system location and a length and a filename for the GPU to execute the binary stream or the FPGA to download the binary stream, etc.

(4) Un/RegisterService

This interface can be configured to cancel or register an algorithm analysis service in the heterogeneous computation management framework of a single work node. The algorithmic analysis service can be a combination of analysis function unit services.

The parameters can include handles returned from the above (1), (2), and (3) after execution.

The four interfaces can be provided for an upper application to register a service. In addition, the work node can provide the following two available interfaces through the heterogeneous computation management framework:

(1) GetMemorySectionRegions

This interface is configured to acquire the type of Process Element (PE) (acceleration module), and the location and the size of data storage proposed by the processing procedure involved in implementation of the whole algorithm.

The parameters can be configuration files in the XML format or arrays in a defined format, and can include a PE type in the procedure distribution and the storage type and size occupied by the acceleration module.

(2) GetPEBin

This interface is configured to acquire the PE (acceleration module) executed binary stream available for the processing procedure involved in implementation of the whole algorithm.

The parameters can be memory or a file system location and a length and a filename for the GPU to execute the binary stream or the FPGA to download the binary stream, etc.

The two interfaces can be provided to the work node for acquiring information of the registered service in the process of executing the artificial intelligent analysis task.

Figure 11:
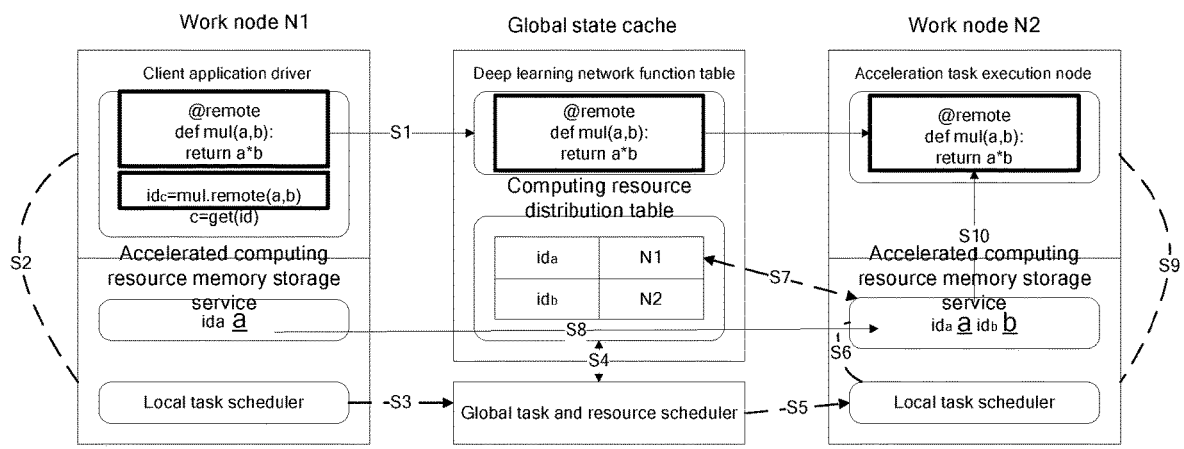
FIG. 11 is an exemplary diagram of a task processing procedure provided by an embodiment of the present disclosure.

FIG. 11 is an exemplary diagram of a task processing procedure provided by an embodiment of the present disclosure. The exemplary embodiment illustrates network weights of a certain artificial intelligent analysis task, and an implementation of the task in the case that the classification feature map is at a remote work node. In this exemplary implementation, the artificial intelligent analysis task can be a basic simple task.

In this exemplary implementation, an application (algorithm) developer publishes an application into a cluster framework by:

(I) completing LoadProcessingStepsConfig, which designates related processing procedures and steps involved in implementation of the whole application algorithm, wherein the related structured information will be stored in a global state cache;

(II) completing SetMemorySectionRegions, which designates the type of Process Element (PE) (acceleration module), and the location and the size of data storage proposed by the processing procedure involved in implementation of the whole algorithm, wherein the related structured information will be stored in a global state cache;

(III) completing SetPEBin, which designates the PE (acceleration module) available for the processing procedure involved in implementation of the whole algorithm to execute a binary stream; and (IV) completing RegisterService, registering an algorithm analysis service in the heterogeneous resources and the task organization service integral framework (i.e., heterogeneous computation management framework) of a single work node.

In this exemplary embodiment, a local client application driver of the work node N1 submits an artificial intelligent analysis task (hereinafter, "analysis task"), which is schematically expressed as A (input data) multiplying B (deep network weight) in this embodiment, and the service thereof is expressed as Multiply (mul), as shown in FIG. 11.

The work node N1 contains local acceleration computing resources (i.e., acceleration modules), memory storage services, and a local task scheduler (i.e., the local task scheduling module in FIG. 5). A plurality of work nodes will broadcast their own resource information after forming a cluster, and the global task and resource scheduler can establish a computing resource distribution table in a global state cache according to the resource information of each work node.

As shown in FIG. 11, the task processing procedure according to this exemplary embodiment includes the steps of S1 to S10.

At step S1, the work node N1 submits an analysis task and data through an application driver, and the local task scheduler checks a deep learning network function table in the global state cache. This step completes the query of a work node with execution capability; for example, a work node N2 is found. For example, the query regarding of the type of PE (acceleration module), and the location and the size of data storage proposed by the processing procedure involved in implementation of the whole algorithm can be implemented through GetMemorySectionRegions as described above.

At step S2, the local task scheduler finds that the analysis task cannot be completed after analyzing the local resources.

At step S3, the local task scheduler forwards the analysis task to the global task and resource scheduler (i.e., the global scheduling module as described above).

At step S4, the global task and resource scheduler determines that the work node N2 has B (deep network weight) after inquiring the computing resource distribution in the global state cache.

At step S5, the global task and resource scheduler transfers the analysis task to the local task scheduler of the work node N2.

At step S6, the local task scheduler of the work node N2 checks the memory storage service of local resources to determine whether there are computing resources required for executing the analysis task.

At step S7, the work node N2, in combination with the computing resource distribution table in the global state cache, determines that the required computing resource A (input data) is located on the work node N1.

At step S8, the local task scheduler of the work node N2 determines a transportation path of the computing resources according to the complete information of the computing resource A (input data) and B (deep network weight) in the computing resource distribution table (in the global state cache). In this embodiment, the computing resource distribution table in the global state cache can be updated according to the transportation path obtained by the work node N2. For example, after updating, the computing resources A is distributed on work nodes N1 and N2, and after the local task scheduler of the work node N1 learns that the updated A is distributed on the work nodes N1 and N2 according to the computing resource distribution table, the computing resource A (input data) can be synchronized to the work node N2 by the accelerated computing resource memory storage service, so as to achieve physical unification of the analysis task and the required resources.

At step S9, the local task scheduler of the work node N2 delivers an artificial intelligent analysis task to the corresponding acceleration task execution node (i.e., heterogeneous unit).

At step S10, the acceleration task execution node carries, by the GetPEBin described above, the PE (acceleration module) executed binary stream available for the processing procedure involved in implementation of the whole algorithm, and completes the computation task.

Herein, reference of the related flow with respect to steps S9 and S10 can be made to the description of FIGS. 8 and 10.

Figure 12:
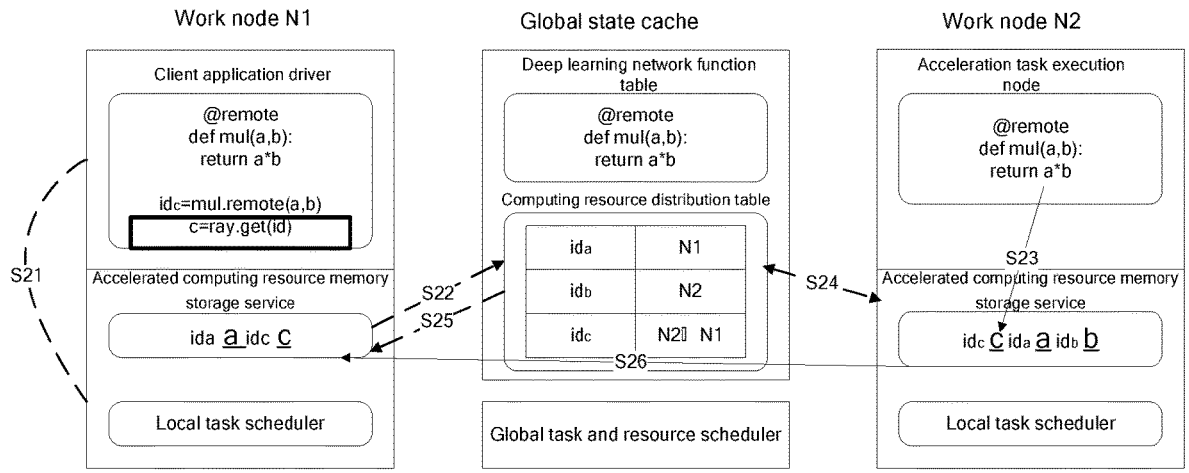
FIG. 12 is another exemplary diagram of a task processing procedure provided by the embodiment of the disclosure.

FIG. 12 is another exemplary diagram of a task processing procedure provided by the embodiment of the disclosure. This exemplary embodiment is explained based on the embodiment shown in FIG. 11, and the application driver of the work node N1 performs an ingestion flow for the execution result of the analysis task.

As shown in FIG. 12, the task processing procedure according to this exemplary embodiment includes the steps of S21 to S26.

At step S21, the work node N1 submits an ingestion request for execution result through an application driver.

At step S22, a local task scheduler of the work node N1 queries a computing resource distribution table in the global state cache.

At step S23, after the acceleration task execution node of the work node N2 completes computation of the analysis task, the obtained execution result is provided to the memory storage service.

At step S24, the memory storage service of the work node N2 synchronizes the execution result to the computing resource distribution table in the global state cache.

At step S25, the work node N1 obtains the execution result from the computing resource distribution table.

At step S26, the local task scheduler of the work node N2 judges a transportation path of the execution result referring to the complete information of the execution result in the computing resource distribution table. In this exemplary embodiment, the computing resource distribution table in the global state cache can be updated according to the transportation path obtained by the work node N2. For example, after updating, the execution result C is distributed on work nodes N1 and N2, and after the local task scheduler of the work node N2 learns that C is distributed on the work nodes N1 and N2 according to the computing resource distribution table, the execution result C can be synchronized to the work node N1 by the accelerated computing resource memory storage service.

The exemplary embodiments shown in FIGS. 11 and 12 illustrate a complete scheduling procedure of an artificial intelligent analysis task based on a resource-oriented scheduling principle after implementing heterogeneous computing and normalization of storage resources.

Figure 13:
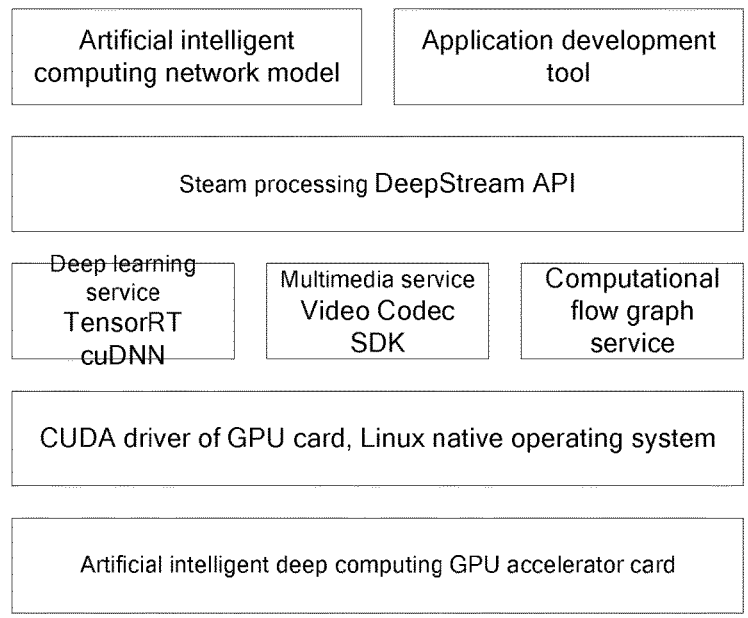
FIG. 13 is a diagram of hardware and software service organizational architecture of GPU.
Figure 14:
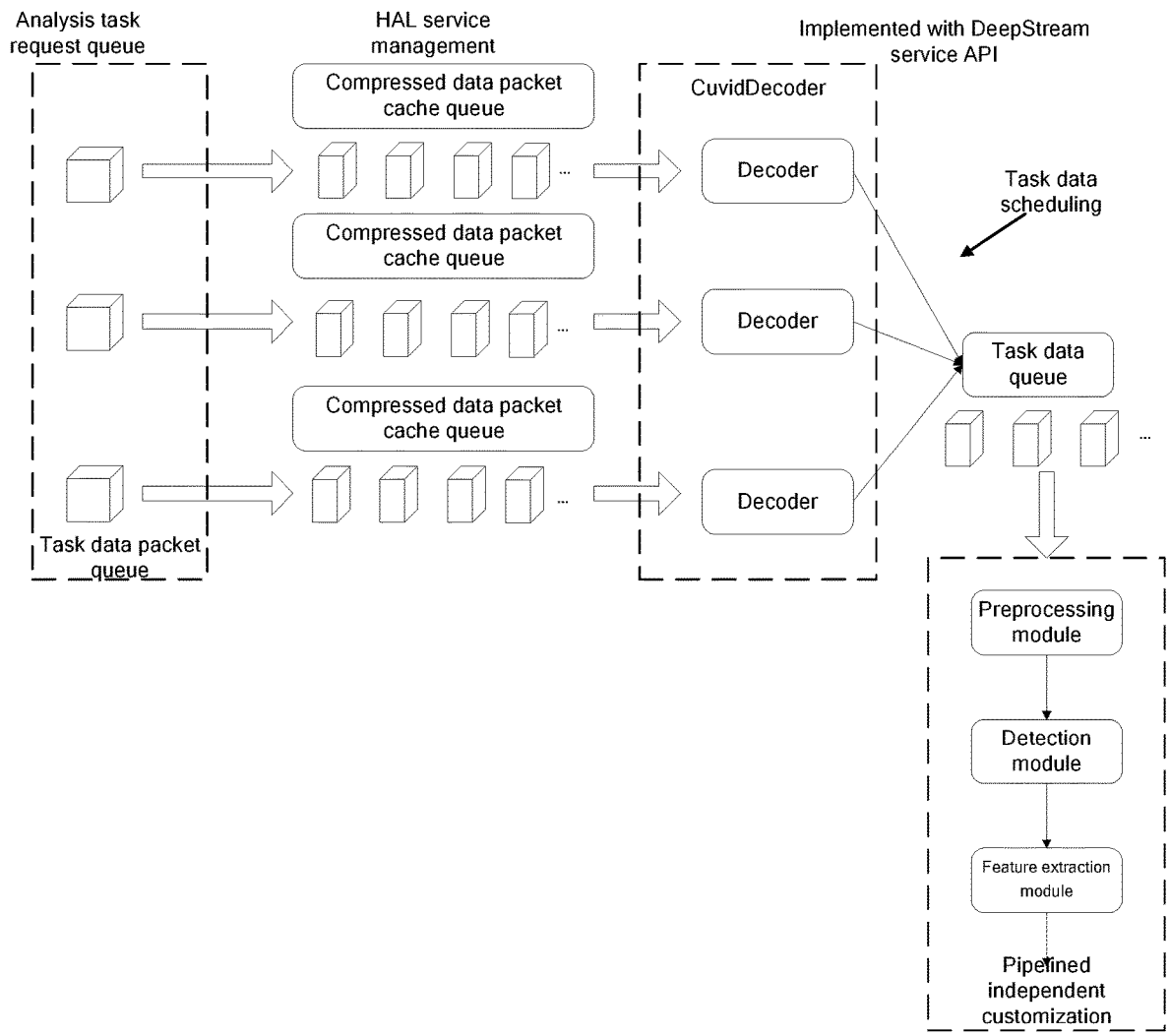
FIG. 14 is an organizational framework diagram of implementing streaming tasks when the heterogeneous unit is GPU.

FIG. 13 is an organizational architecture diagram of hardware and software services of GPU; and FIG. 14 is an organizational framework diagram of implementing streaming tasks when the heterogeneous unit is a GPU.

As shown in FIG. 13, the hardware and software service organizational architecture of GPU includes: steam processing DeepStream API (Application Programming Interface), a computational flow graph service (streaming task processing organization and data management module, Bitstream Management), a deep learning service (TensorRT, cuDNN), a multimedia service (Video Codec SDK), a CUDA (Compute Unified Device Architecture) driver, and a GPU accelerator card.

As shown in FIG. 14, the HAL, which is encapsulated by the hardware characteristics of CUDA and the GPU accelerator card, implements management of a compressed data packet and a task data queue, while, in combination with a stream processing DeepStream framework thereof, implementing autonomous customization of a task pipeline to connect a plurality of acceleration implementation modules in series. The preprocessing module can be implemented by combining the GPU multimedia service, the detection module can be implemented by combining TensorRT, and the feature extraction module can be a user-defined implementation module.

Figure 15:
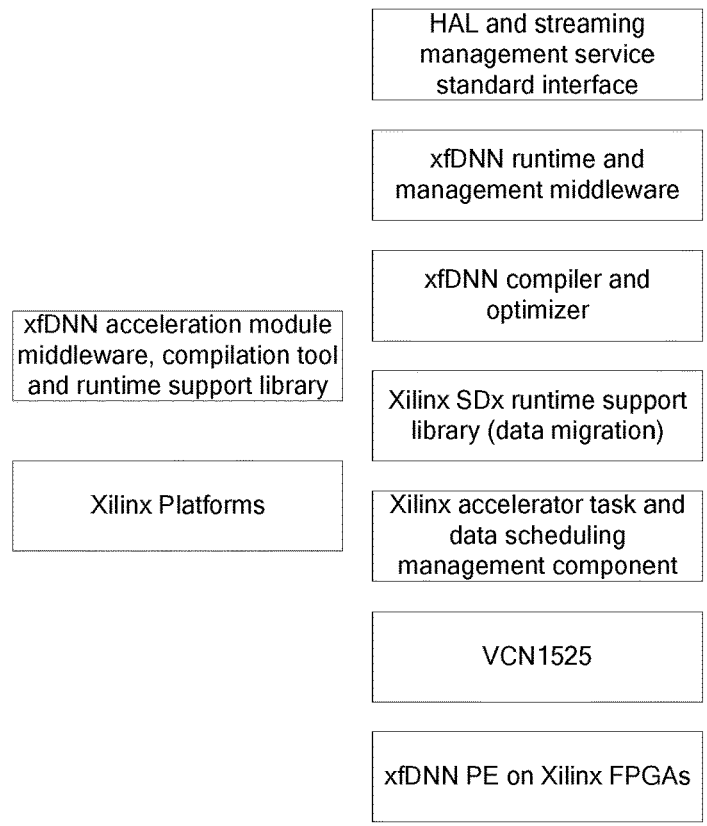
FIG. 15 is a diagram of software and hardware service organizational architecture of FPGA.
Figure 16:
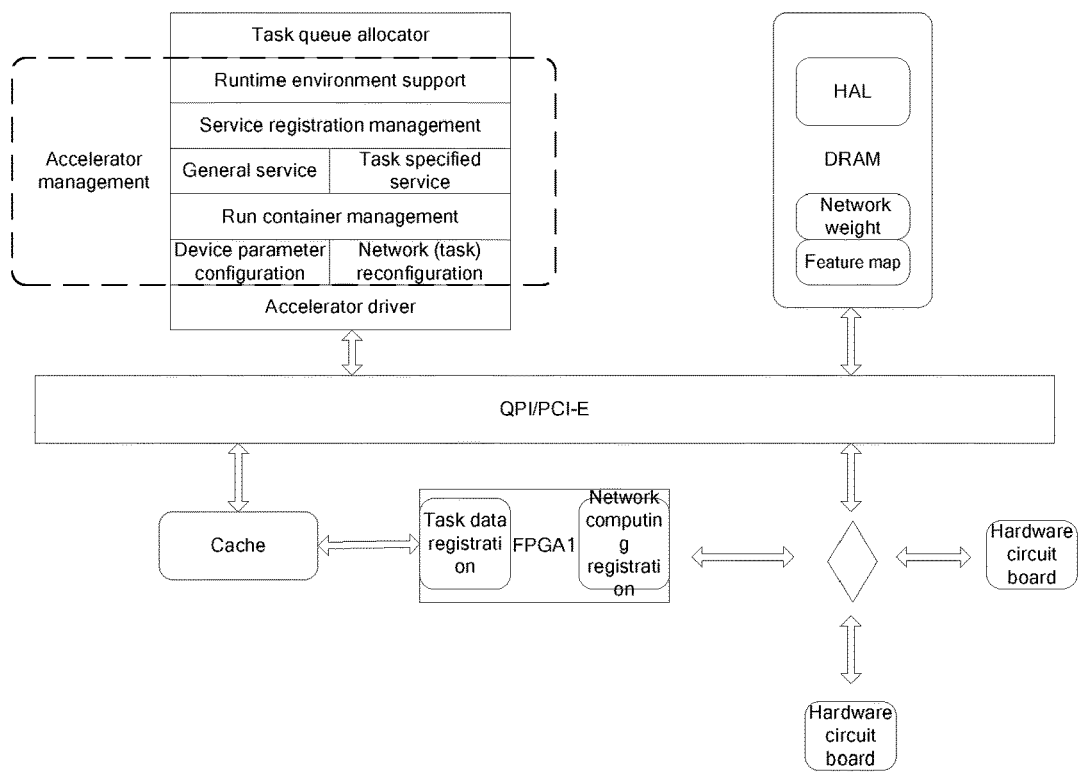
FIG. 16 is an organizational framework diagram of implementing streaming tasks when the heterogeneous unit is FPGA.

FIG. 15 is a diagram of software and hardware service organizational architecture of FPGA. FIG. 16 is an organizational framework diagram of implementing streaming tasks when the heterogeneous unit is FPGA.

As shown in FIG. 15, taking Xilinx FPGA as an example, in a software and hardware service organizational architecture of a basic FPGA, a hardware unit includes: an xfDNN artificial intelligent computing core and a FPGA device and a board card (VCN 1525) loaded therein; and the corresponding software unit includes: a deep learning network task reconfiguration interface and service module (Xilinx accelerator task and data scheduling management component); a low latency data-transportation software driver (Xilinx SDx runtime support library) and deep learning model network optimization and compilation services (xfDNN compiler and optimizer, i.e., FPGA hardware execution flow tools for deep learning network model conversion).

In this exemplary embodiment, based on the heterogeneous unit runtime support part of the heterogeneous daemon, and the method for implementing the HAL unified service of data storage and transportation and the hierarchical data flow, the software organization of FPGA implementing the streaming tasks is finally realized by using an accelerated computing unit driving layer management module existing in a kernel state and by forming the HAL module in combination with a DRAM data driver. As shown in FIG. 16, the accelerated calculator (unit) driving layer manages a northbound interface to complete registration and downloading of task data and network computing hardware execution flow of in the FPGA example, a southbound interface to complete ingestion and runtime support of specific tasks (including runtime environment support, registration management of specific hardware acceleration services, and configuration of device parameters), and the corresponding FPGA to execute reconfiguration of the example.

As shown in FIG. 16, different FPGA hardware devices are connected to each other based on the PCI-E bus, and complete the connection with the master CPU. The specific FPGA can complete downloading of the registered task data and execution of the computing network. A unified HAL is formed at the CUP side and DRAMs (Dynamic Random Access memories) of each FPGA acceleration unit side, so as to complete transmission and storage of the data unit required for the computation of, for example, a network model and a feature map. The accelerator management module at the CPU side acquires tasks from the task queue allocator based on the FPGA accelerator driver and software module, and checks consistency between the device and the device required by the registration task, before finally uploading the corresponding FPGA execution binary execution flow, and completing downloading and initiation of the device parameter configuration and the execution flow by the accelerator driver.

Figure 17:
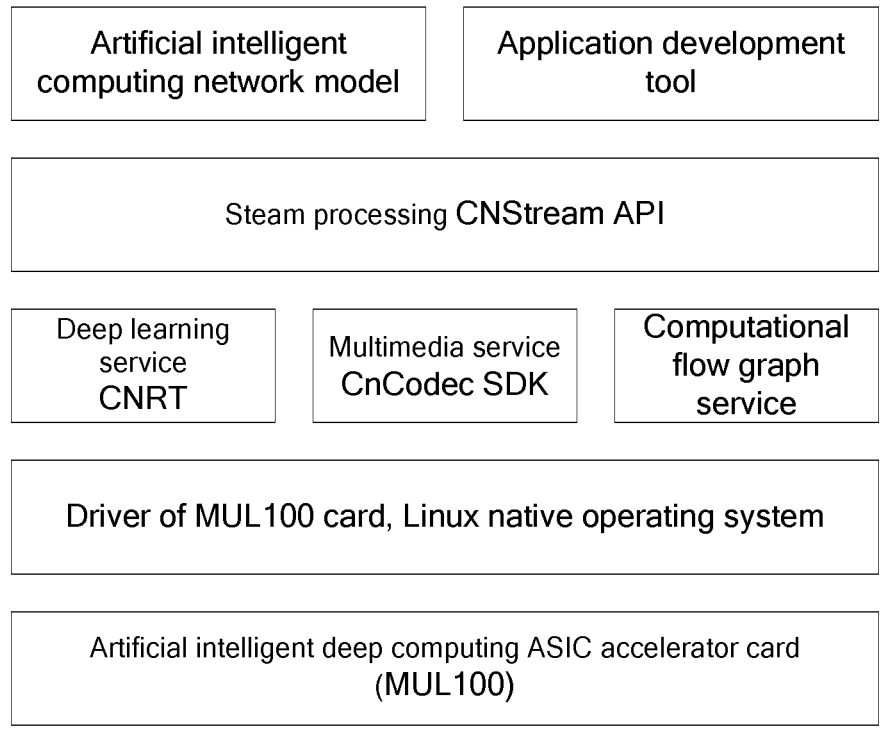
FIG. 17 is an organizational architecture diagram of hardware and software services of MUL100.

FIG. 17 is an organizational architecture diagram of hardware and software services of MUL100. The exemplary embodiment illustrates an implementation of a streaming task organizational framework of an edge artificial intelligent all-in-one machine composed of an artificial intelligent reasoning ASIC like Google TPU. The following implementation flow takes the MUL100 card as an example.

As shown in FIG. 17, the hardware and software service organizational architecture of MUL100 includes: stream processing CNstream API, a computational flow graph service (streaming task processing organization and data management module), a deep learning service (CNRT), a multimedia service (CnCodec), a driver, and an ASIC accelerator card.

Referring to FIG. 17, the streaming task organizational framework of the all-in-one machine can be implemented by the hardware characteristics of the MUL100 card and the encapsulated HAL by the driver, in combination with the stream processing CnStream framework thereof.

Figure 18:
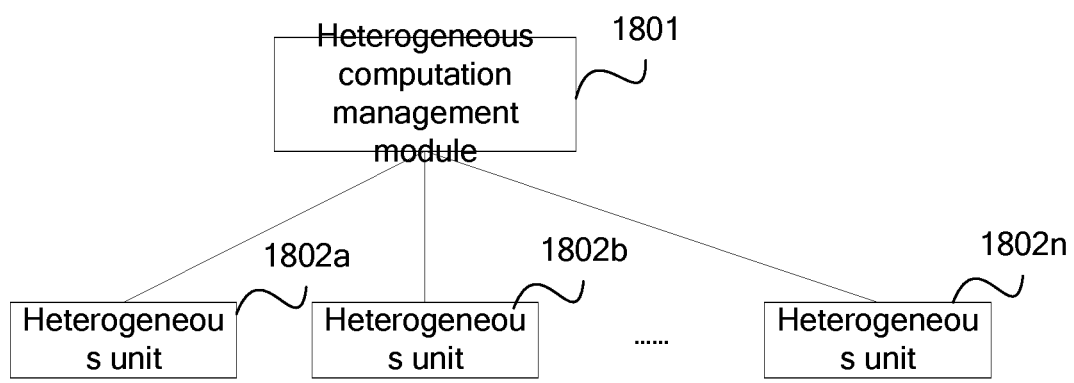
FIG. 18 is a schematic diagram of a heterogeneous computing-based task processing device according to an embodiment of the present disclosure.

FIG. 18 is a schematic diagram of a heterogeneous computing-based task processing device according to an embodiment of the present disclosure. As shown in FIG. 18, the task processing device provided in the embodiment includes: a heterogeneous computation management module 1801, and a plurality of heterogeneous units (e.g., 1802a, 1802b and 1802n). The heterogeneous computation management module 1801 is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a hierarchical data flow. Different stages of sub-tasks have different types, one type of sub-tasks corresponds to one analysis function unit service, and each analysis function unit service uniformly schedules a plurality of heterogeneous units to execute a corresponding sub-task.

In an exemplary embodiment, each analysis function unit service can be a progress corresponding to a runtime context.

In an exemplary embodiment, The task management device of this embodiment can further include: an HAL; wherein the HAL can support the following standard characteristics implemented by standard Software Shell and Hardware Shell: unified memory of the single work node where the task management device is located; concurrent support to a multitask progress of a single heterogeneous unit; RDMA between heterogeneous units; and concurrent computation and transmission of heterogeneous units.

In an exemplary embodiment, data flow interaction can be implemented between different analysis function unit services via the RDMA service provided by the HAL.

In an exemplary embodiment, the heterogeneous computation management module 1801 includes at least: a heterogeneous daemon client and a heterogeneous daemon server. The heterogeneous daemon client is configured to maintain and manage an accelerated computation task queue of an artificial intelligent analysis task, manage a client side task context, and provide a standard read/write interface for input data and output data of the artificial intelligent analysis task at the client side. The heterogeneous daemon server can include an application layer task management module and a kernel layer acceleration module block type driving management module. The application layer task management module is configured to provide a client service interface, maintain and manage an accelerated computation task queue of the artificial intelligent analysis task at the server side, and manage a server side task context. The kernel layer acceleration module block type driving management module is configured to provide a read/write interface for block driving data, and manage and schedule channels and queues of the acceleration module.

In an exemplary embodiment, the heterogeneous unit can include one or more of: a CPU, a GPU, an FPGA and an ASIC.

In addition, for related description of the task management device provided in this embodiment, reference can be made to the description of the method embodiment described above, and thus, the description is not repeated here.

In an embodiment of the present disclosure, there is further provided a heterogeneous computing-based software and hardware framework system, including: at least one work node, any of which includes a plurality of heterogeneous units; wherein the work node is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a hierarchical data flow. Different stages of sub-tasks have different types, one type of sub-tasks corresponds to one analysis function unit service, and each analysis function unit service uniformly schedules the plurality of heterogeneous units in the work node to execute a corresponding sub-task.

In an exemplary embodiment, each analysis function unit service can be a progress corresponding to a runtime context.

In an exemplary embodiment, any work node can be configured to implement the following standard characteristics by standard Software Shell and Hardware Shell: unified memory of a single work node; concurrent support to a multitask progress of a single heterogeneous unit; RDMA between heterogeneous units; and concurrent computation and transmission of heterogeneous units.

In an exemplary embodiment, data flow interaction can be implemented between different analysis function unit services via the RDMA service provided by the HAL.

In an exemplary embodiment, any work node can be provided with a heterogeneous computation management framework configured to support heterogeneous units based on a heterogeneous daemon. The heterogeneous computation management framework can include at least: a heterogeneous daemon client and a heterogeneous daemon server. The heterogeneous daemon client is configured to maintain and manage an accelerated computation task queue of an artificial intelligent analysis task, manage a client side task context, and provide a standard read/write interface for input data and output data of the artificial intelligent analysis task at the client side. The heterogeneous daemon server can include an application layer task management module and a kernel layer acceleration module block type driving management module. The application layer task management module is configured to provide a client service interface, maintain and manage an accelerated computation task queue of the artificial intelligent analysis task at the server side, and manage a server side task context. The kernel layer acceleration module block type driving management module is configured to provide a read/write interface for block driving data, and manage and schedule channels and queues of the acceleration module.

In an exemplary embodiment, the heterogeneous unit can include one or more of: a CPU, a GPU, an FPGA and an ASIC.

In an exemplary embodiment, for example, as shown in FIGS. 5 and 6, the software and hardware framework system of this embodiment can include a plurality of work nodes, and the system can be deployed with a global scheduling module. When any work node determines that the local resources cannot satisfy the execution requirements of the artificial intelligent analysis task, the work node is configured to submit the artificial intelligent analysis task to the global scheduling module, where the global scheduling module determines a work node for executing the artificial intelligent analysis task by inquiring the global task state information stored in the system.

In addition, for related description of the software and hardware framework system provided in this embodiment, reference can be made to the description of the method embodiment described above, and thus, the description is not repeated here.

In addition, in an embodiment of the present application, there is further provided a computer-readable medium storing a heterogeneous computing-based task processing program, wherein the task processing program, when executed, implements the steps of the task processing method as described above, such as the steps shown in FIG. 3.

Those of ordinary skill in the art will appreciate that all or some steps of the above described method, functional modules/units in the system and apparatus can be implemented as software, firmware, hardware, and suitable combinations thereof. In a hardware implementation, the division between the functional modules/units mentioned in the above description does not necessarily correspond to the division of physical components; for example, one physical component can have multiple functions, or one function or step can be performed cooperatively by several physical components. Some or all components can be implemented as software executed by a processor, such as a digital signal processor or microprocessor, or implemented as hardware, or implemented as an integrated circuit, such as an application specific integrated circuit. Such software can be distributed on a computer readable medium which can include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or can be any other medium used for storing the desired information and accessible by a computer. Moreover, it is well known to those skilled in the art that communication medium typically includes a computer readable instruction, a data structure, a program module, or other data in a modulated data signal, such as a carrier wave or other transport mechanism, and can include any information delivery medium.

What is claimed is:

1. A heterogeneous computing-based task processing method, applied to a work node including a plurality of heterogeneous units, which comprises steps of:
   breaking down an artificial intelligent analysis task into one stage or multiple stages of sub-tasks, wherein the different stages of sub-tasks have different types, and one type of sub-tasks corresponds to one analysis function unit service; and
   completing, by one or more analysis function unit services corresponding to the one stage or multiple stages of sub-tasks, the artificial intelligent analysis task by means of a data flow, wherein each analysis function unit service schedules a plurality of heterogeneous units to execute a corresponding sub-task;
   wherein the work node is provided with a heterogeneous computation management framework configured to support the heterogeneous units based on a heterogeneous daemon, the heterogeneous computation management framework comprising at least: a heterogeneous daemon client and a heterogeneous daemon server;

the heterogeneous daemon client is configured to maintain and manage an accelerated computation task queue of the artificial intelligent analysis task and manage a client side task context, and provide a standard read/write interface for input data and output data of the artificial intelligent analysis task at the client side; and the heterogeneous daemon server comprises an application layer task management module and a kernel layer acceleration module block type driving management module, wherein the application layer task management module is configured to provide a client service interface, maintain and manage the accelerated computation task queue of the artificial intelligent analysis task at the server side, and manage a server side task context; the kernel layer acceleration module block type driving management module is configured to provide a read/write interface for block driving data, and manage and schedule channels and queues of the acceleration module.

2. The method according to claim 1, wherein each analysis function unit service is a progress corresponding to a runtime context.

3. The method according to claim 1, wherein the multiple stages of sub-tasks are executed by the same heterogeneous unit or by at least two heterogeneous units.

4. The method according to claim 1, wherein the work node implements the following characteristics through a standard Software Shell and a standard Hardware Shell: unified memory of a single work node; concurrent support to a multitask progress of a single heterogeneous unit; Remote Direct Memory Access (RDMA) between heterogeneous units; and concurrent computation and transmission of heterogeneous units.

5. The method according to claim 4, wherein data flow interaction is implemented between different analysis function unit services via a RDMA memory service provided by a Hardware Abstraction Layer (HAL).

6. The method according to claim 1, wherein each analysis function unit service records a snapshot of a running result of a corresponding sub-task.

7. The method according to claim 1, wherein the heterogeneous unit comprises at least one of: a Central Processing Unit (CPU), a Graphics Processing Unit (GPU), a Field-Programmable Gate array (FPGA) and an Application Specific Integrated Circuit (ASIC).

8. The method according to claim 1, wherein the artificial intelligent analysis task comprises a visual artificial intelligent reasoning task; the analysis function unit service corresponding to the visual artificial intelligent reasoning task comprises: a video image format decoding service, an image target detection service, an image target tracking and optimal selection service and a target feature value extraction service.

9. The method according to claim 1, wherein before the step of breaking down the artificial intelligent analysis task into one stage or multiple stages of sub-tasks, the method further comprises: determining that local resources of the work node satisfy execution requirements of the artificial intelligent analysis task.

10. The method according to claim 9, wherein a cluster consisting of a plurality of work nodes is deployed with a global scheduling module, and global task state information is stored in the cluster; and the method further comprises: submitting, when the work node determines that the local resources are not able to satisfy the execution requirements of the artificial intelligent analysis task, the artificial intelligent analysis task to the global scheduling module of the cluster, where the global scheduling module determines a work node for executing the artificial intelligent analysis task by inquiring the global task state information.

11. The method according to claim 1, wherein the step of breaking down the artificial intelligent analysis task into one stage or multiple stages of sub-tasks comprises:

determining, according to a type of the artificial intelligent analysis task, information of a registered service set corresponding to the type; and breaking down the artificial intelligent analysis task into one stage or multiple stages of sub-tasks according to the information of the registered service set, wherein each stage of sub-tasks corresponds to an analysis function unit service.

12. A heterogeneous computing-based software and hardware framework system, comprising: at least one work node, any of which comprises a plurality of heterogeneous units;

the work node is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a data flow, wherein the different stages of sub-tasks have different types, one type of sub-tasks corresponds to one analysis function unit service, and each analysis function unit service schedules the plurality of heterogeneous units in the work node to execute a corresponding sub-task;

wherein any of the work nodes is provided with a heterogeneous computation management framework configured to support the heterogeneous units based on a heterogeneous daemon, the heterogeneous computation management framework comprising at least: a heterogeneous daemon client and a heterogeneous daemon server;

the heterogeneous daemon client is configured to maintain and manage an accelerated computation task queue of the artificial intelligent analysis task, manage a client side task context, and provide a standard read/write interface for input data and output data of the artificial intelligent analysis task at the client side; and the heterogeneous daemon server comprises an application layer task management module and a kernel layer acceleration module block type driving management module, wherein the application layer task management module is configured to provide a client service interface, maintain and manage the accelerated computation task queue of the artificial intelligent analysis task at the server side, and manage a server side task context; the kernel layer acceleration module block type driving management module is configured to provide a read/write interface for block driving data, and manage and schedule channels and queues of the acceleration module.

13. The system according to claim 12, wherein each analysis function unit service is a progress corresponding to a runtime context.

14. The system according to claim 12, wherein each work node is configured to implement the following characteristics through a standard Software Shell and a standard Hardware Shell: unified memory of a single work node; concurrent support to a multitask progress of a single heterogeneous unit; Remote Direct Memory Access (RDMA) between heterogeneous units; and concurrent computation and transmission of heterogeneous units.

15. The system according to claim 14, wherein data flow interaction is implemented between different analysis function unit services via a RDMA memory service provided by a Hardware Abstraction Layer (HAL).

16. The system according to claim 12, wherein the heterogeneous unit comprises at least one of: a Central Processing Unit (CPU), a Graphics Processing Unit (GPU), a Field-Programmable Gate array (FPGA) and an Application Specific Integrated Circuit (ASIC).

17. The system according to claim 12, wherein the system comprises a plurality of work nodes, and the system is deployed with a global scheduling module, wherein under the condition that any work node determines that the local resources are not able to satisfy the execution requirements of the artificial intelligent analysis task, the work node is configured to submit the artificial intelligent analysis task to the global scheduling module, where the global scheduling module determines a work node for executing the artificial intelligent analysis task by inquiring the global task state information stored in the system.

18. A heterogeneous computing-based task processing device, comprising: a heterogeneous computation management module, and a plurality of heterogeneous units; the heterogeneous computation management module is configured to break down an artificial intelligent analysis task into one stage or multiple stages of sub-tasks, and complete, by one or more analysis function unit services corresponding to the one stage or multiple stages of sub-tasks, the artificial intelligent analysis task by means of a data flow, wherein the different stages of sub-tasks have different types, one type of sub-tasks corresponds to one analysis function unit service, and each analysis function unit service schedules a plurality of heterogeneous units to execute a corresponding sub-task;
wherein the heterogeneous computation management module comprises at least: a heterogeneous daemon client and a heterogeneous daemon server;
the heterogeneous daemon client is configured to maintain and manage an accelerated computation task queue of the artificial intelligent analysis task, manage a client side task context, and provide a standard read/write interface for input data and output data of the artificial intelligent analysis task at the client side; and
the heterogeneous daemon server comprises an application layer task management module and a kernel layer acceleration module block type driving management module, wherein the application layer task management module is configured to provide a client service interface, maintain and manage the accelerated computation task queue of the artificial intelligent analysis task at the server side, and manage a server side task context; the kernel layer acceleration module block type driving management module is configured to provide a read/write interface for block driving data, and manage and schedule channels and queues of the acceleration module.

19. The device according to claim 18, wherein each analysis function unit service is a progress corresponding to a runtime context.

20. The device according to claim 18, further comprising: a Hardware Abstraction Layer (HAL);
the HAL supports implementation of the following characteristics through a standard Software Shell and a standard Hardware Shell: unified memory of the single work node where the task management device is located; concurrent support to a multitask progress of a single heterogeneous unit; Remote Direct Memory Access (RDMA) between heterogeneous units; and concurrent computation and transmission of heterogeneous units.

21. The device according to claim 20, wherein data flow interaction is implemented between different analysis function unit services via a RDMA memory service provided by the HAL.

22. The device according to claim 18, wherein the heterogeneous unit comprises at least one of: a Central Processing Unit (CPU), a Graphics Processing Unit (GPU), a Field-Programmable Gate array (FPGA) and an Application Specific Integrated Circuit (ASIC).

* * * * *